US008064112B1

(12) United States Patent
Bernasconi

(10) Patent No.: US 8,064,112 B1
(45) Date of Patent: Nov. 22, 2011

(54) COLOR SEPARATION AND REPRODUCTION METHOD TO CONTROL A PRINTING PROCESS

(75) Inventor: Matthew J. Bernasconi, Charlotte, NC (US)

(73) Assignee: Opaltone Australasia Pty. Ltd., Ashmore, Queensland (AU)

(*) Notice: Subject to any disclaimer, the term of this patent is extended or adjusted under 35 U.S.C. 154(b) by 1008 days.

(21) Appl. No.: 11/941,408

(22) Filed: Nov. 16, 2007

Related U.S. Application Data

(60) Provisional application No. 60/939,071, filed on May 20, 2007.

(51) Int. Cl.
*H04N 1/04* (2006.01)

(52) U.S. Cl. ......... 358/515; 358/1.9; 358/502; 358/518; 382/167; 382/300; 345/115; 345/232

(58) Field of Classification Search .......... 358/515, 358/3.26, 3.27, 1.9, 518, 521, 530, 532, 1.15, 358/502; 382/275, 300, 167; 347/115, 251, 347/232, 131, 43
See application file for complete search history.

(56) References Cited

U.S. PATENT DOCUMENTS

| 5,329,385 | A  | * | 7/1994  | Washio ..................... 358/515 |
| 5,528,377 | A  | * | 6/1996  | Hutcheson ................ 358/1.9 |
| 5,751,326 | A  |   | 5/1998  | Bernasconi |
| 6,225,974 | B1 |   | 5/2001  | Marsden et al. ........... 345/590 |
| 6,340,095 | B1 | * | 1/2002  | Walter ...................... 221/130 |
| 6,340,975 | B2 | * | 1/2002  | Marsden et al. ........... 345/590 |
| 6,595,611 | B1 | * | 7/2003  | Ruffino ......................... 347/5 |
| 6,778,300 | B1 |   | 8/2004  | Kohler |
| 6,922,197 | B2 | * | 7/2005  | Saito ......................... 345/602 |
| 7,128,394 | B2 | * | 10/2006 | Takenaka .................... 347/43 |
| 7,193,747 | B2 | * | 3/2007  | Saito ......................... 358/1.9 |
| 7,679,781 | B2 | * | 3/2010  | Shibuya et al. ............ 358/1.9 |
| 7,751,086 | B2 | * | 7/2010  | Sakaue et al. .............. 358/2.1 |
| 2001/0017627 | A1 | * | 8/2001  | Marsden et al. ........... 345/501 |
| 2002/0186388 | A1 | * | 12/2002 | Tanioka et al. ............ 358/1.9 |
| 2004/0125411 | A1 | * | 7/2004  | Tonami et al. ............. 358/2.1 |
| 2004/0130738 | A1 | * | 7/2004  | Yagishita et al. .......... 358/1.9 |
| 2005/0012948 | A1 | * | 1/2005  | Gotoh et al. ............... 358/1.9 |
| 2005/0213160 | A1 | * | 9/2005  | Namikata ................. 358/3.27 |
| 2006/0071970 | A1 | * | 4/2006  | Takenaka .................... 347/43 |
| 2007/0046961 | A1 | * | 3/2007  | Kashibuchi et al. ....... 358/1.9 |
| 2007/0070464 | A1 | * | 3/2007  | Saito .......................... 358/515 |
| 2008/0080765 | A1 | * | 4/2008  | Gregory .................... 382/167 |

* cited by examiner

*Primary Examiner* — Negussie Worku

(74) *Attorney, Agent, or Firm* — Summa, Additon & Ashe, P.A.

(57) ABSTRACT

A computerized printer utilizes a color separation and printing process that adds brightness, saturation and ink density to traditional CMYK printing processes and optionally eliminates the need for Black (K) color separation data and Black ink in the printer. The process includes the creation of Red, Green, and Blue (R'G'B') color separation data channels for use by a computer processor to complement the dynamic range of traditional Cyan, Magenta, and Yellow (CMY) color separation data channels. Accordingly, the process gives printers the capacity to utilize a six-color separation process with Cyan, Magenta, Yellow, Red, Green, and Blue (CMYR'G'B') color separation data channels. The standard Black (K) separation data can be combined within the R'G'B' separation data to optically simulate Black ink in print. The process can be applied to printing processes including: digital, flexography, inkjet, lithography, rotary gravure, rotary letterpress and screen-printing.

16 Claims, 16 Drawing Sheets

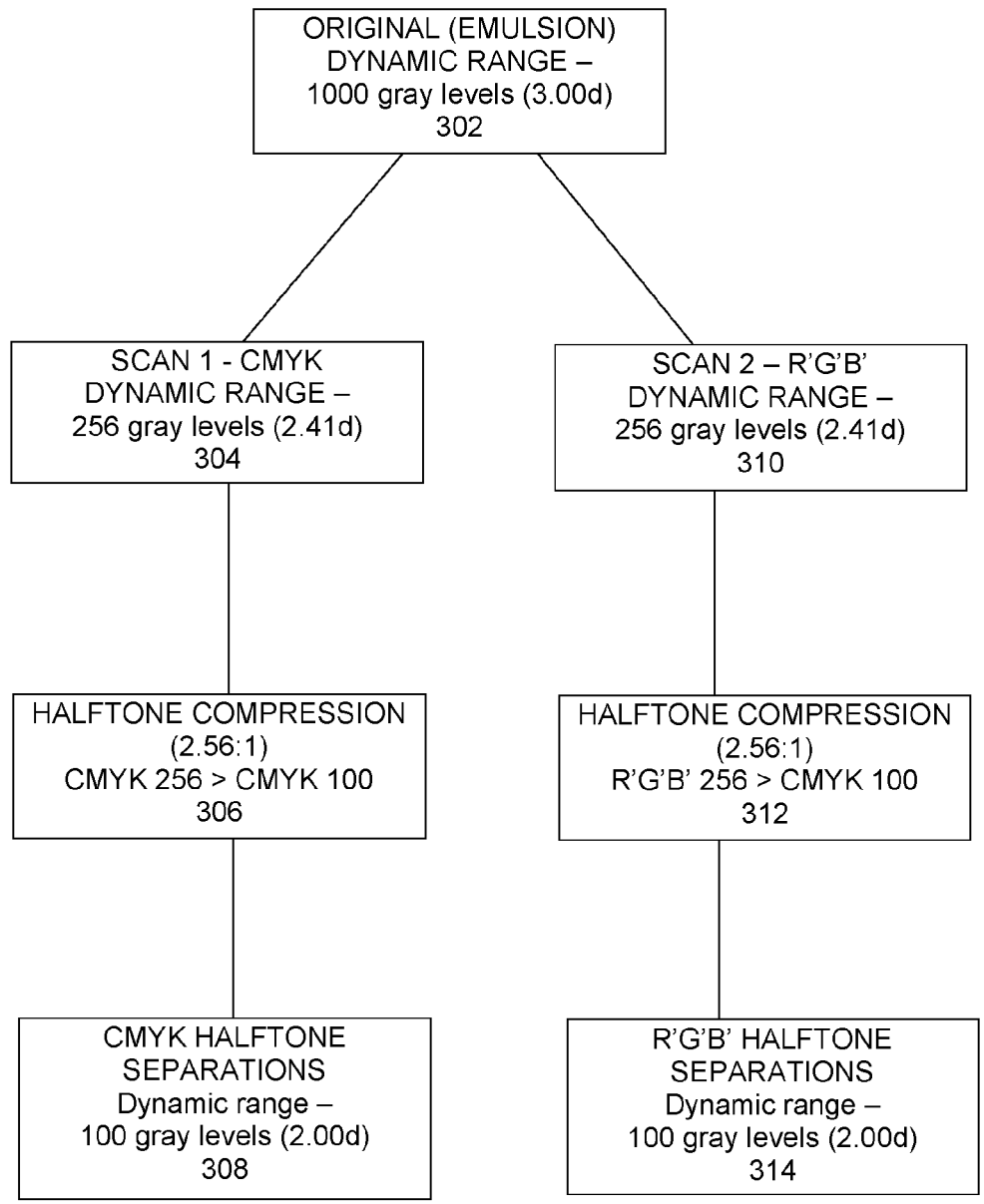

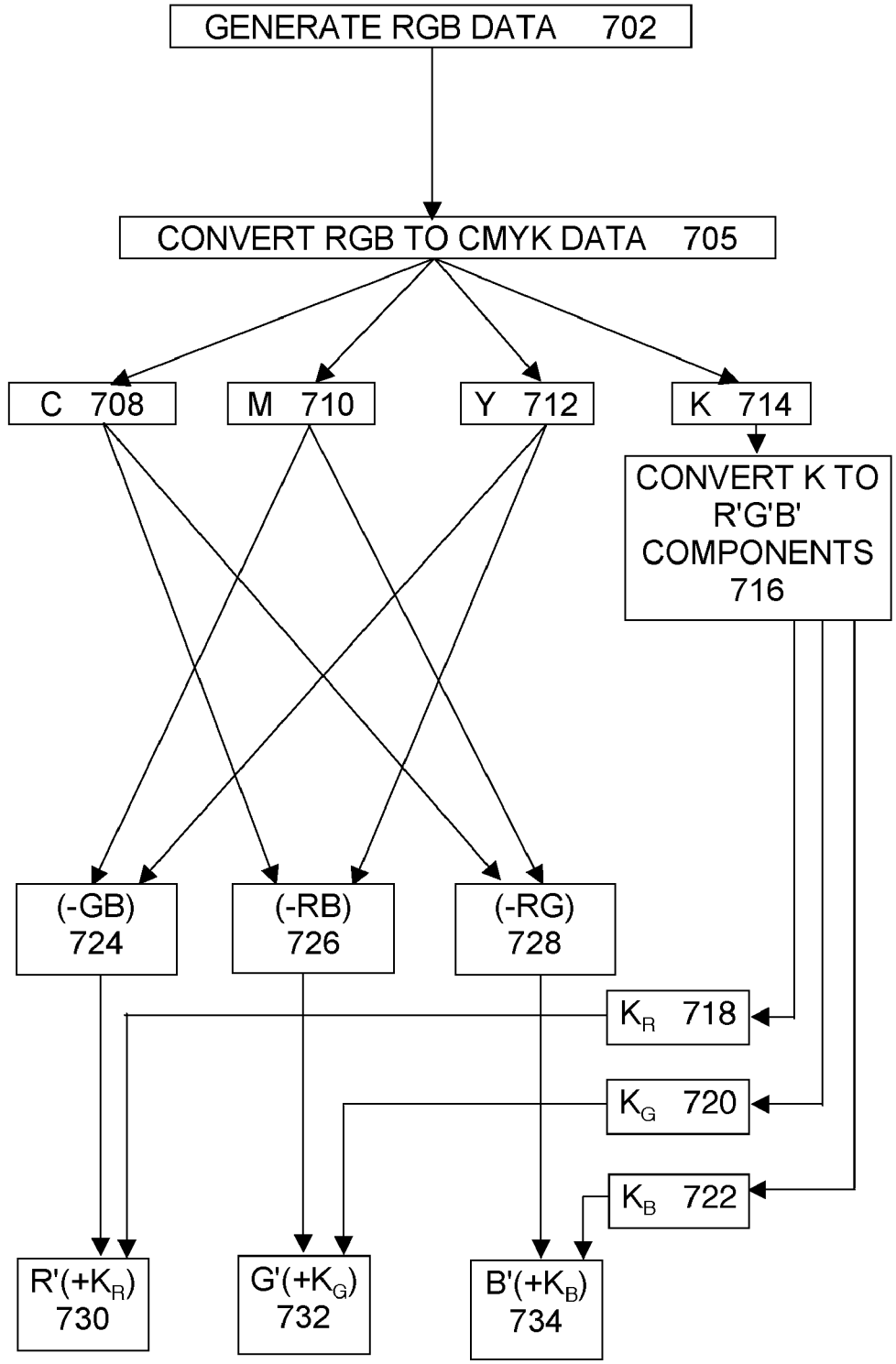

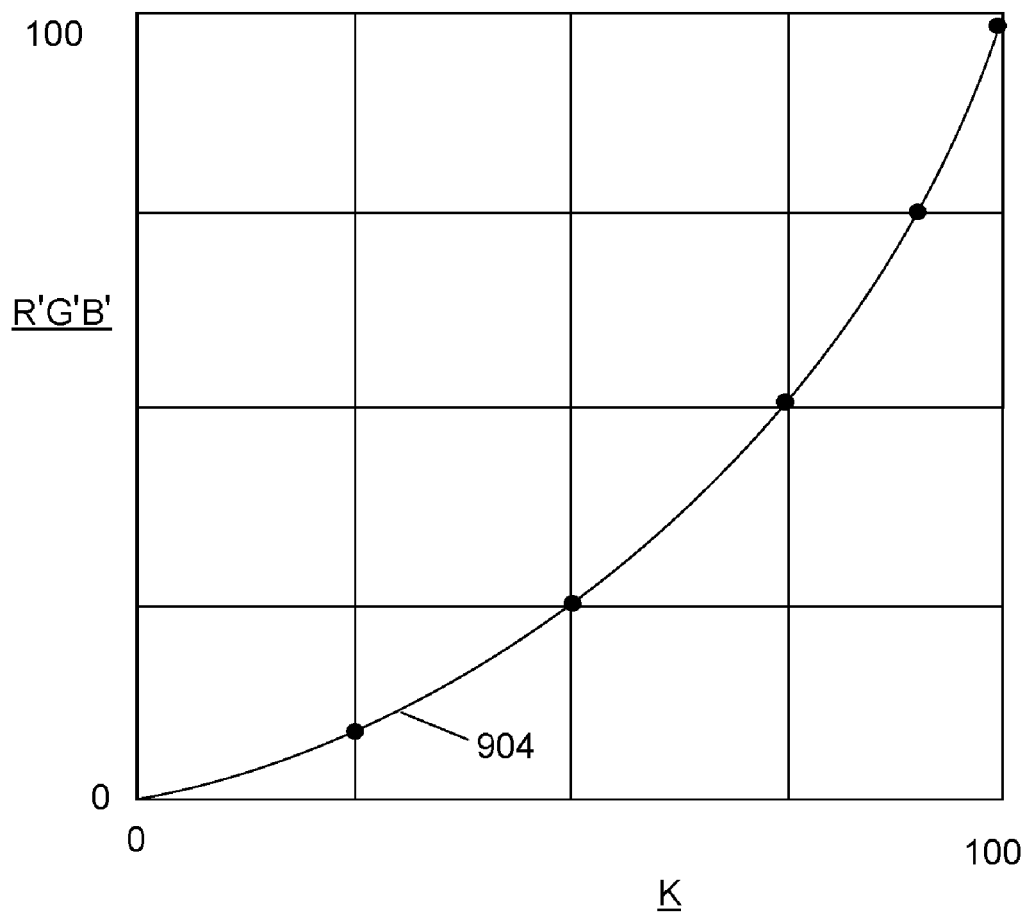

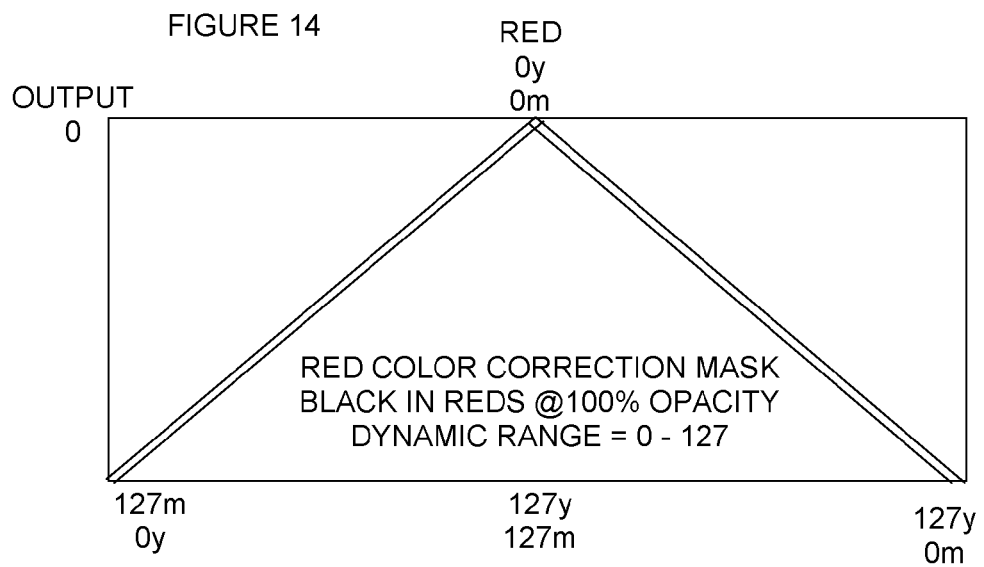
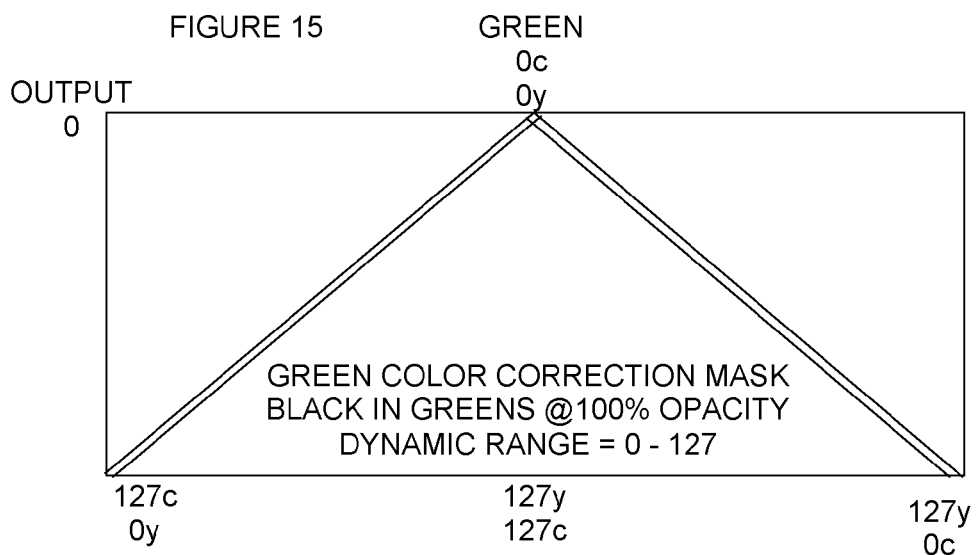
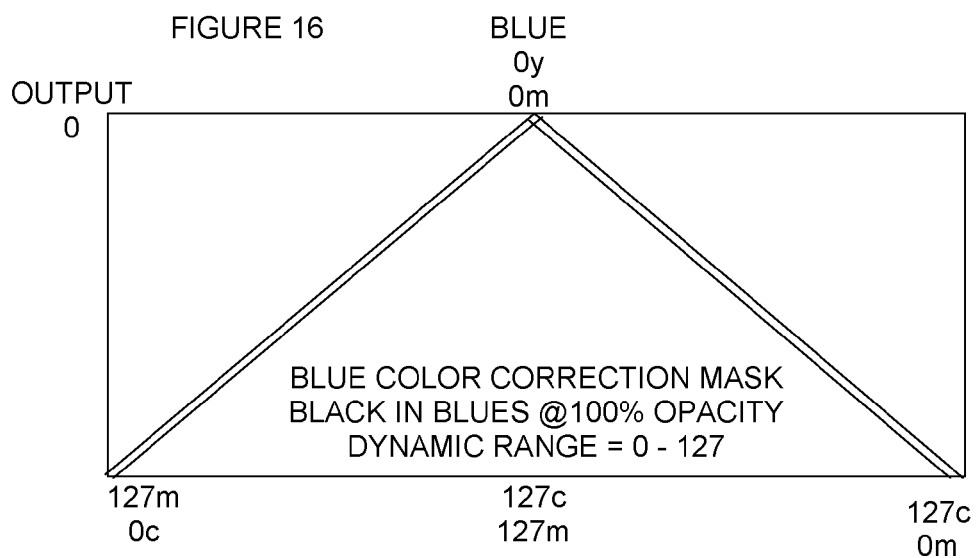

COMPRESSED K CHANNEL DATA
GAMMA = 0.00
DYNAMIC RANGE = 0 - 0

COLOR SEPARATION AND REPRODUCTION METHOD TO CONTROL A PRINTING PROCESS

CROSS REFERENCE TO RELATED APPLICATIONS

This application claims priority to Provisional U.S. Application Ser. No. 60/939,071, filed May 20, 2007, the entire disclosure of which is hereby incorporated by reference.

FIELD OF THE INVENTION

The present invention relates generally to the art of color separation and reproduction in print. In particular, a 6-color (CMYR'G'B') separation process that can be applied to a printing process, namely, Digital, Flexography, Inkjet, Lithography, Rotary Gravure, Rotary Letterpress, and screen-printing.

BACKGROUND OF THE INVENTION

U.S. Pat. No. 5,751,326, (Bernasconi), issued to the present applicant, describes a method of color separation for a printing process wherein an image source is scanned one or more times to produce a plurality of data channels each of which provides a representation of one color separation of the image source, the data provided by each channel being restricted to represent a printable tone density range, and the channels being separated into two groups, a first providing separation data representing Cyan, Magenta, Yellow and Black (CMYK) separations, the second providing Red, Green and Blue (R'G'B') separation data representing a saturation image.

U.S. Pat. No. 5,751,326 describes a method of scanning an image to produce CMYK data and then adjusting the datum while scanning an image again to generate a second R'G'B' data set. This R'G'B' color separation data was derived directly from the original image.

As described in U.S. Pat. No. 5,751,326, the CMYK printing process can only reproduce a limited tonal range, commonly referred to at the CMYK "color gamut". Saturated Red, Green and Blue hues reproduced with Cyan, Magenta and Yellow (CMY) inks alone will often lack saturation and high ink density due to the limitations of the printable dynamic range. Halftone screening technologies can only reproduce 100 gray levels per primary color. Tone compression from the CMY ink densities also restricts the printable color gamut.

In recent years conventional drum or flatbed scanners that can color separate photographic originals, namely panchromatic emulsions, utilizing Red, Green and Blue (RGB) filters, have become virtually redundant in the graphic arts industry. Conventional drum or flatbed scanners have rapidly been replaced by digital cameras, where no panchromatic emulsion exists in the immediate creation of a color image. The data captured by a digital camera has already been digitally separated into three (3) gray scale images commonly known in the graphic arts and printing industries as a Red, Green and Blue (RGB) digital image.

A number of different color models have been developed to define color spaces, such as RGB, CIELAB (L*a*b*), L*C*h°, CMYK, etc. The International Color Consortium (ICC) has developed a specification defining "profiles" relating to the characteristics of the various groups. ICC profiles are used to describe the color attributes of a particular device or viewing requirement by defining a mapping between the source or target color space and a Profile Connection Space (PCS). This PCS can be either L*a*b* or CIE XYZ color space. Mappings may be done using tables, to which interpolation is applied, or through a series of algorithms or parameters for transformations. To convert from RGB to CMYK, the first step is to obtain the two ICC profiles concerned. To perform the conversion, each RGB triplet R, G, B is first converted to the PCS using the RGB profile. If necessary, the PCS is converted between L*a*b* and CIE XYZ, a well-defined transformation. Then the PCS is converted to the four values of C, M, Y, K required.

Every device that captures or displays color will have its own ICC profile. Some manufacturers provide profiles for their products, and there are also several software products available that enable end users to generate their own ICC profiles, typically through the use of a colorimeter or spectrodensitometer.

In CMYK process printing, each primary Cyan, Magenta and Yellow (CMY) ink absorbs Red, Green and Blue light respectively. In theory, a region having 300% (C+M+Y) ink coverage should reproduce an achromatic (Black) appearance, subject to the print density of each primary ink. In practice however, overprinting CMY alone results in a dark brown hue. The CMY density attained typically does not exceed 1.50.

This is because the combined (trapped) CMY inks fail to absorb all the complementary (RGB) light transmitted. Black (K) ink is traditionally used to overprint CMY, thereby absorbing the residual RGB light. The trapped C+M+Y+K result reproduces and denser, more neutralized Black appearance. The CMYK density attained typically exceeds 1.80.

In converting RGB data to printable CMYK data, the RGB data must first be converted to L*a*b* data, and then the L*a*b* data must be converted to CMYK data using appropriate conversion methods such as ICC profiles. Color information on the display monitor may "appear" to be lost during this color conversion procedure. The industry term used for this apparent loss of color information is called "gamut compression". For example, digital color images must first be converted from RGB (256 gray levels per primary color) to CMYK (100 gray levels per primary color) in order to reproduce them using CMYK inks and halftone screens. This is because no known print process can print continuous shades of gray. This RGB to CMYK color conversion can also be referred to as the "halftone preparation" step.

It is important to note that even after the CMYK data had been assigned 100 gray levels per primary color (to ultimately produce a halftone separation), the actual "background" digital data residing in the CPU is still 256 gray levels per primary color (8-bit data). The physical halftone compression step to 100 gray levels per primary color has yet to occur. The CMYK data has simply been "prepared" in readiness to produce a printable halftone range for each color separation: C, M, Y and K. This final compression step is only applied when the CMYK data is processed through a software Raster Imager Processor (R.I.P.) to create a 1-bit TIFF file. A 1-bit TIFF file can only record 100 gray (halftone) levels per primary color. Therefore, every 2.56 CMYK gray levels must be assigned only one (1) output halftone value to record the dynamic range of 2.00 ($\log_{10} 100 = 2.00$). The compression ratio is 2.56:1.

Attempts to find the optimum formula for conversion between RGB and CMYK values and L*a*b* often founder because RGB and CMYK are not absolute color spaces and so have no precise relation to L*a*b*. To convert between RGB and L*a*b*, for example, it is necessary to determine or assume an absolute color space for the RGB data, such as sRGB or Adobe RGB (1998). For each of these absolute spaces, there are standard techniques for converting to and from the XYZ absolute color space (see for example sRGB color space specification of the transformation) which can be combined with the following transformations to convert them to L*a*b*.

The following formulae is commonly known and used by the ICC for transforming XYZ to CIE L*a*b* (CIELAB).

The forward transformation:—

$$L^* = 116 f(Y/Y_n) - 16$$

$$a^* = 500[f(X/X_n) - f(Y/Y_n)]$$

$$b^* = 200[f(Y/Y_n) f(Z/Z_n)]$$

where $f(t) = t^{1/3}$ for $t > 0.008865$,
$f(t) = 7.787t + 16/116$ otherwise.

Here $X_n$, $Y_n$ and $Z_n$ are the CIE XYZ tristimulus values of the reference white point.

The division of the f(t) function into two domains was done to prevent an infinite slope at t=0. f(t) was assumed to be linear below some t=t0, and was assumed to match the $t^{1/3}$ part of the function at $t_0$ in both value and slope. In other words:

$$t_0^{1/3} = at_0 + b \text{(match in value)}$$

$$1/(3t_0^{2/3}) = a \text{(match in slope)}$$

The value of b was chosen to be 16/116. The above two equations can be solved for a and $t_0$.
$a = 1/(3\delta^2) = 7.787037\ldots$
$t_0 = \delta^3 = 0.008856\ldots$
where $\delta = 6/29$. Note that $16/116 = 2\delta/3$.

The International Color Consortium defines the format precisely but do not define algorithms or processing details. This means there is room for variation between different applications and systems that work with ICC profiles.

BRIEF SUMMARY OF THE INVENTION

It is desirable to provide a method for use via a computer processor in a printer (50) generating printed matter (60), the method including appropriate steps for obtaining color separation data thus improving on known processes and/or ameliorating one or more of the problems of the known processes.

The process of the invention derives second color separation data from first color separation data, the first data and the second data being available for use in a printing process.

The first data can be compressed color separation data, and the second data can be complementary color separation data.

The compressed data can be CMYK data and the complementary data can be adapted to at least partially compensate for the dynamic range lost from the compressed CMYK data as a result of tone compression to a printable dynamic range.

In one embodiment, a color separation process is provided wherein standard Cyan, Magenta & Yellow (CMY) color separations are complemented with Red, Green and Blue (R'G'B') color separations to reproduce a color gamut in a print process. The R'G'B' color separations are derived from the cross-coupled CMY data channels.

The standard Black (K) separation data can be combined within the R'G'B' color separations to optically simulate Black ink in print.

The invention also provides a method for converting grayscale data to substitute color separation data.

The substitute data can be combined with the complementary data.

The invention also provides a digital color separation process to create color separation data which represents a combined saturation and neutral gray tonal range.

BRIEF DESCRIPTION OF THE DRAWINGS

A preferred embodiment of the invention will now be described, by way of example, with reference to the accompanying drawings in which:

FIG. 3 illustrates a prior art process for generating color separations;

FIG. 7B represents a modification of FIG. 7A;

FIG. 8 illustrates a table for conversion of Black (K) color separation data according to an embodiment of the invention;

FIG. 9 illustrates a chart for conversion of Black (K) color separation data according to an embodiment of the invention;

FIG. 14 illustrates a Red color correction mask;

FIG. 15 illustrates a Green color correction mask;

FIG. 16 illustrates a Blue color correction mask;

DETAILED DESCRIPTION OF THE PREFERRED EMBODIMENTS

Figure 1:
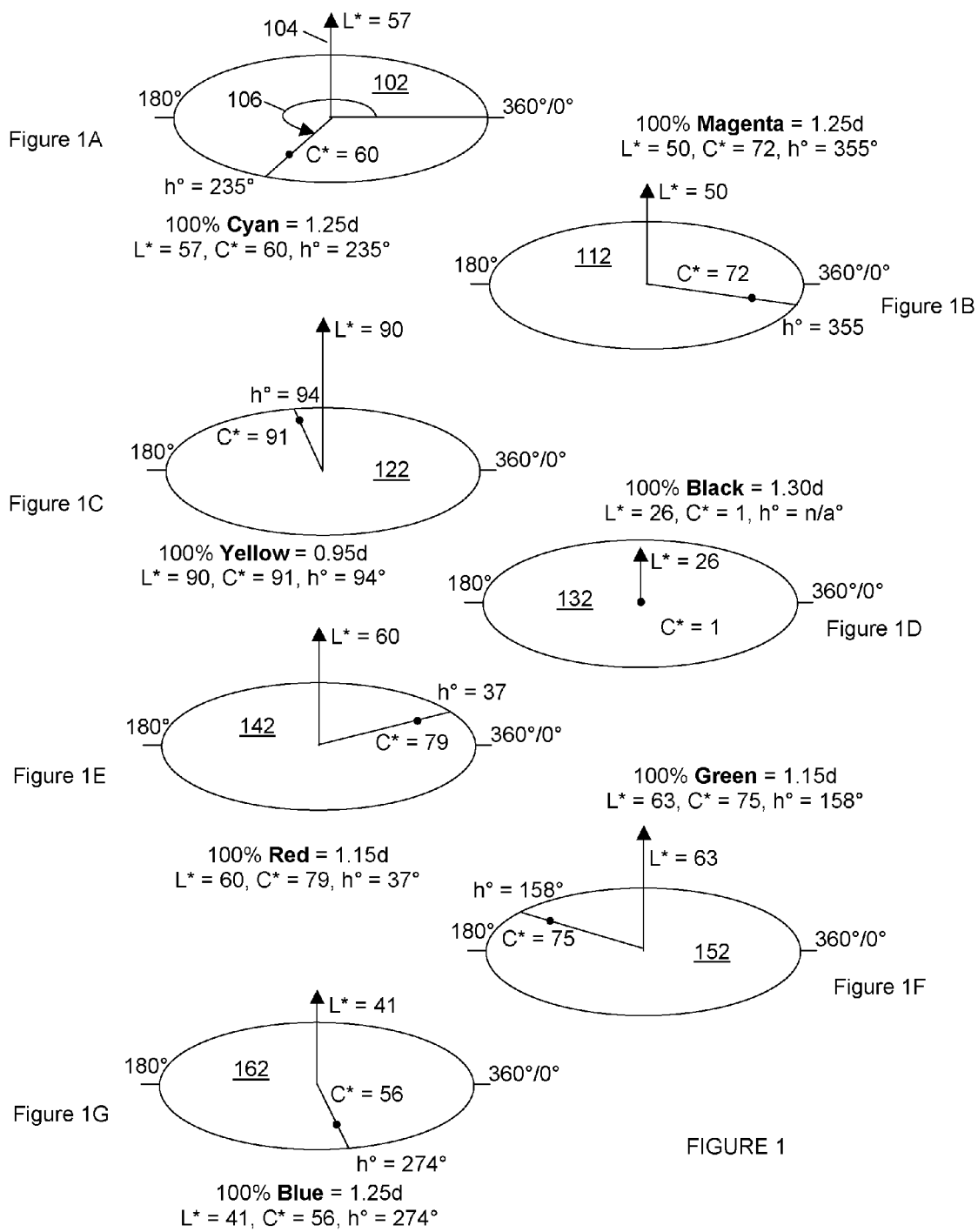
FIG. 1 illustrates exemplary L*C*h° and absolute density values for Cyan, Magenta, Yellow, Black, Red, Green and Blue printing inks.

The invention will be described with reference to the embodiments shown in the drawings. Without limiting the scope of the invention, the computerized method disclosed herein is applicable, at a minimum, to printing processes controlled, at least in part, by a computer processor. The computer processor may be any type of software driven device known in the art, including but not limited to raster image processors.

The improving speed of computers and the development of International Color Consortium (ICC) profiles according to the International Organization for Standardization (ISO) standard—ISO 15076, enables a process according to an embodiment of the present invention to be implemented by applying a series of ICC profiles and suitable color data conversion techniques to RGB, L*a*b* and CMYK color separation data to selectively or simultaneously create Red, Green and Blue (R'G'B') color separation data channels representing a saturation image which can be used to complement the dynamic range of the CMY data to compensate for the loss of dynamic range from the CMYK data set as a result of tone compression to a printable dynamic range.

A further embodiment of the present invention involves the optional elimination of the process Black (K) color separation data and the optional elimination of the Black (K) ink within any printing process. The conventional process Black (K) color separation data and Black printing ink can be substituted, when required, with Red, Green and Blue color separation data and Red, Green and Blue printing ink respectively to simulate a neutral or gray tonal range in print. According to an embodiment of the invention, neutral or gray tone is defined under the $L^*C^*h°$ color space wherein the Chroma ($C^*$) value is three (3) or less, where the $L^*C^*h°$ color space is measured according to the ISO standard—ISO 13655.

The addition of Red, Green and Blue color separations printed in Red, Green and Blue inks respectively will add superior brightness, saturation and density when combined with the Cyan, Magenta and Yellow separations printed in Cyan, Magenta and Yellow inks respectively. For example, a three (3) color overprint combination of Red, Magenta and Yellow ink will reproduce a Red hue with much stronger saturation and density of approximately 1.80 compared to a two (2) color Magenta and Yellow overprint density of approximately 1.40. A three (3) color overprint combination of Green, Cyan and Yellow ink will produce a Green hue with much stronger saturation and density of approximately 1.80 when compared to a two (2) color Cyan and Yellow overprint density of approximately 1.40. A three (3) color overprint combination of Blue, Cyan and Magenta ink will produce a Blue hue with much stronger saturation and density of approximately 1.80 when compared to a two (2) color Cyan and Magenta overprint density of approximately 1.40. The combined Red, Green, and Blue print densities of 1.80, achieved by a combination of Red, Magenta and Yellow color separation data or Green, Cyan and Yellow or Blue color separation data, Cyan and Magenta color separation data, is due to the additional Red, Green and Blue color separation data being recorded via a second halftone dynamic range.

The Black (K) ink can be further substituted by overprinting equal parts of Red, Green and Blue ink to reproduce an achromatic density of approximately 1.80. The CMYK dynamic range of 100 gray levels per primary color ($\log_{10} 100 = 2.00$) is automatically extended when the second R'G'B' dynamic range of 100 gray levels per primary color overprints the first CMYK dynamic range. The total dynamic range is therefore extended to 200 gray levels per primary color separation. This equates to an effective printable dynamic range of 2.30 d ($\log_{10} 200 = 2.30$).

In one embodiment, the present invention provides a method of color separation for a print process wherein a primary $L^*a^*b^*$ data source is digitally converted by applying a series of conversion steps to produce secondary and tertiary color separation data sets, the secondary color separation data set representing a printable dynamic range provided from the primary color separation data set, the tertiary color separation data set representing a printable dynamic range and compensating for color saturation data lost from the secondary color separation data set as a result of tone compression to a printable dynamic range; transferring gray scale data provided from the secondary color separation data set to an intermediate color separation data set; combining the intermediate color separation data set with the tertiary color separation data set; removing the gray scale data from the secondary color separation data set. The secondary color separation data set representing Cyan, Magenta, Yellow and Black (CMYK) separations. The tertiary color separation data representing Red, Green and Blue (R'G'B') color separations comprising a combined saturation and neutral gray tonal range and substantially comprising a representation of the dynamic range lost from the secondary CMYK color separation data set as a result of tone compression to a printable dynamic range. The traditional process Black (K) color separation and Black printing ink will be replaced by overprinting equal parts of Red, Green and Blue ink to simulate the neutral gray tonal range in print.

The achromatic tonal range for the Red, Green and Blue color separations can be extrapolated from the process Black (K) color separation data channel, the data from the Black (K) color separation data channel being duplicated and combined into the Red, Green and Blue color separation data channels. The data within the Black (K) color separation data channel being deleted from the CMYK data set.

An industry standard spectrodensitometer can be used to measure $L^*C^*h°$ data for the Cyan, Magenta, Yellow, Black (K), Red, Green and Blue printing inks to be printed utilizing a printing process. The spectrodensitometer should be programmed to measure D50/2 and STATUS T absolute density. Densitometric measurements are made in accordance with ANSI CGATS.4-1993 (reaffirmed 1998).

FIG. 1 illustrates the density and $L^*C^*h°$ values for the Cyan, Magenta, Yellow, Black, Red, Green and Blue printing inks.

Referring again to FIG. 1, at a solid ink density of 1.25, the Cyan ink should measure $L^*=57$, $C^*=60$, $h°=235$. At a solid ink density of 1.25, the Magenta ink should measure $L^*=50$, $C^*=72$, $h°=355$. At a solid ink density of 0.95, the Yellow ink should measure $L^*=90$, $C^*=91$, $h°=94$. At a solid ink density of 1.15, the Red ink should measure $L^*=60$, $C^*=79$, $h°=37$. At a solid ink density of 1.15, the Green ink should measure $L^*=63$, $C^*=75$, $h°=158$. At a solid ink density of 1.25, the Blue ink should measure $L^*=41$, $C^*=56$, $h°=274$. The Black ink should measure a solid print density of 1.30.

The $L^*C^*h°$ values quoted relate to printing the Cyan, Magenta, Yellow, Red, Green and Blue (CMYR'G'B') inks onto a substrate with a reference Chroma ($C^*$) value of less than two (2) and a reference density of 0.08 (Dmin) or less. The CMYR'G'B' inks should be printed within a $\Delta E$ (delta E) of five (5) or less relative to the $L^*C^*h°$ values quoted. A Red, Green and Blue overprint that contains equal halftone percentages of Red, Green and Blue ink should have an achromatic appearance wherein the Chroma ($C^*$) value measured is three (3) or less.

FIGS. 1 & 2 illustrate aspects of color definition schemes which will be referred to in the following description.

FIG. 1 illustrates $L^*C^*h°$ values for CMYK and R'G'B' where $L^*$ is the lightness (luminance), $C^*$ is chroma, $h°$ is hue and D is absolute density.

As shown at 102, for Cyan, $L^*=57$, $C^*=60$, $h°=235$ and $D=1.25$.

At 112, the values for Magenta are shown as, $L^*=50$, $C^*=72$, $h°=355°$ and $D=1.25$.

At 122, the values for Yellow are shown as, $L^*=90$, $C^*=91$, $h°=94°$ and $D=0.95$.

At 132, the values for Black are shown as, $L^*=26$, $C^*=1$, $h°=n/a$ and $D=1.25$.

At 142, the values for Red are shown as, $L^*=60$, $C^*=79$, $h°=37°$ and $D=1.15$.

At 152, the values for Green are shown as, $L^*=63$, $C^*=75$, $h°=158°$ and $D=1.15$.

At 162, the values for Blue are shown as, L*=41, C*=56, h°=274° and D=1.25.

The formula for calculating the optimum solid print density for a process ink is: (L*+C)/2=bv. Where: L=Lightness, C=Chroma, bv=Brightness Value. *Rule: L<C. This formula need only be applied to the Blue and Cyan inks because they have the lowest brightness values relative to process Magenta: 61 bv, Green: 69 bv, Red: 69.5 bv and Yellow: 90.5 bv.

For example, Blue printed at 1.25 density: (41+56)/2=48 bv. As you increase Blue ink above 1.30 density, the bv will actually decrease. Therefore, the optimum ink film thickness (density) is directly correlated to the highest bv. The Red and Green process inks are then printed in gray balance relative to the Blue density (correlated to the highest bv).

Cyan printed at 1.25 density: (57+60)/2=58.5 bv. The Magenta and Yellow process inks are printed in gray balance relative to the Cyan density (correlated to highest bv).

The solid ink density values at 102, 112, 122, 132, 142, 152 & 162 must also be reproduced within the halftone dynamic range (2.00 d) for each color separation. For example, Cyan ink should be calibrated to print at halftone density values of; 100%=1.25 (Dmax), 75%=0.85, 50%=0.52, 25%=0.29, 5%=0.12, 0%=0.08 (Dmin). Magenta ink should be calibrated to print at; 100%=1.25 (Dmax), 75%=0.85, 50%=0.52, 25%=0.29, 5%=0.12, 0%=0.08 (Dmin). Yellow ink should be calibrated to print at; 100%=0.95 (Dmax), 75%=0.72, 50%=0.48, 25%=0.29, 5%=0.12, 0%=0.08 (Dmin). Black ink (optional) should be calibrated to print at; 100%=1.30 (Dmax), 75%=0.85, 50%=0.52, 25%=0.29, 5%=0.12, 0%=0.08 (Dmin). Red ink should be calibrated to print at; 100%=1.15 (Dmax), 75%=0.82, 50%=0.52, 25%=0.29, 5%=0.12, 0%=0.08 (Dmin). Green ink should be calibrated to print at; 100%=1.15 (Dmax), 75%=0.82, 50%=0.52, 25%=0.29, 5%=0.12, 0%=0.08 (Dmin). Blue ink should be calibrated to print at; 100%=1.25 (Dmax), 75%=0.85, 50%=0.52, 25%=0.29, 5%=0.12, 0%=0.08 (Dmin).

Figure 2A:
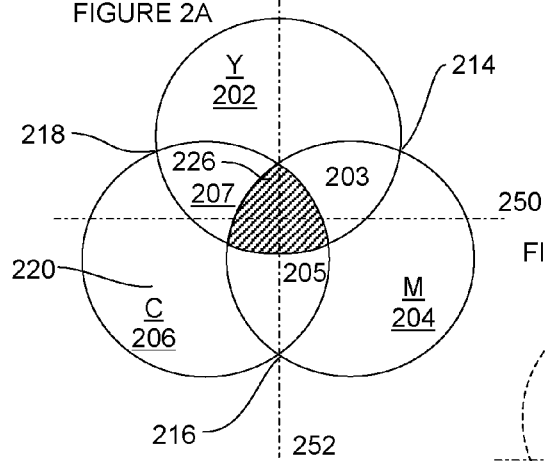
FIG. 2A illustrates CMY ink overprints for a print process.

FIG. 2A illustrates the CMY inks as three overlapping circles where 202 is the Yellow circle, 204 is the Magenta circle, and 206 is the cyan circle. The circles are arranged around a set of orthogonal axes 250, 252. The Yellow circle 202 and the Magenta circle 204 overlap (see cusp 214) to form a blended region 203 which appears as varying hues of red, depending on the proportions of Magenta and Yellow ink which are graphically indicated by the hue angle-h° illustrated in FIG. 2D.

Similarly, the Magenta and Cyan circles 204, 206 overlap at 205 to provide a range of Blue hues as determined by the hue angle-h°, and the Yellow and Cyan circles 202, 206 overlap at 207 to provide a range of Green hues as determined by the angle hue-h°. A tricuspid central region 226 represents the overlap of the C, M, and Y circles.

Figure 2B:
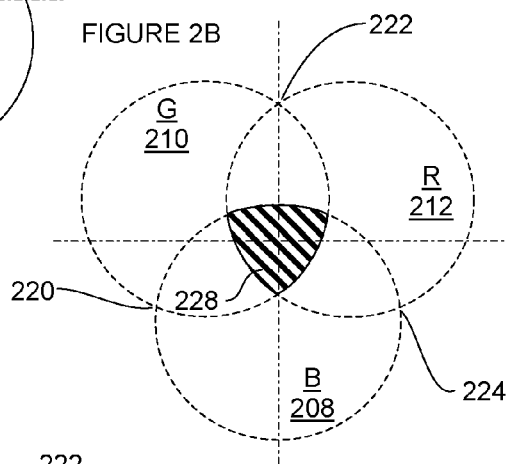
FIG. 2B illustrates R'G'B' ink overprints for a print process.

FIG. 2B illustrates illustrates the R'G'B' inks as three overlapping circles, with circle 208 being the Blue circle, 210 being the Green circle, and 212 being the Red circle. Again there are regions of overlap of the Red and Green circles (see cusp 222), which can be combined to produce a dark brown region. Similarly Red and Blue (see cusp 224), and Green and Blue (see cusp 220). A tricuspid region 228 is defined by the ink overlap of Red, Green, and Blue that can combine to produce a gray/black or achromatic region.

Figure 2C:
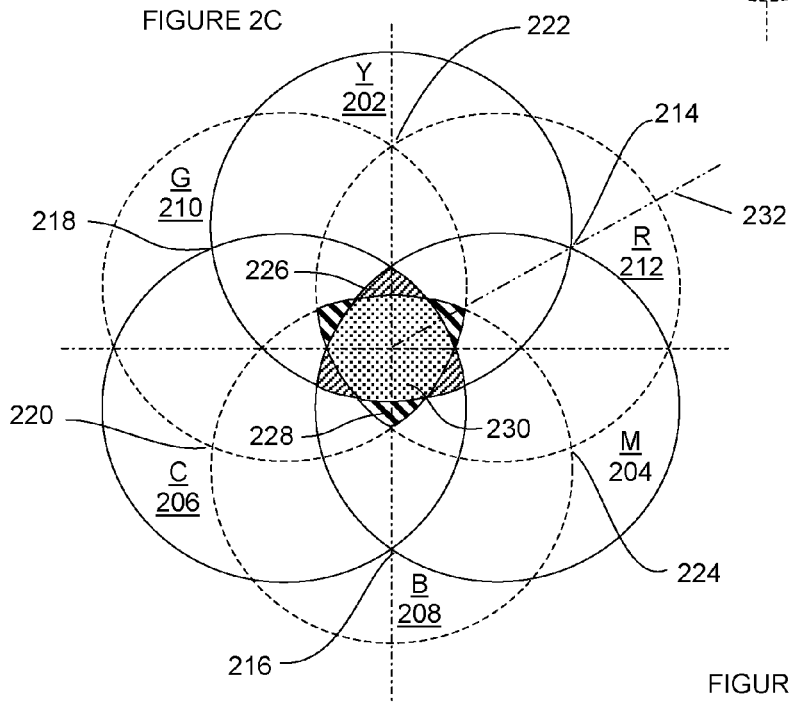
FIG. 2C illustrates the R'G'B' overprints combined with the CMY overprints.
Figure 2D:
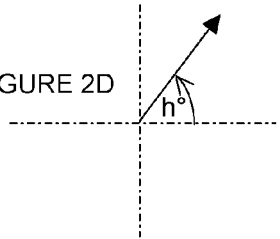
FIG. 2D illustrates the hue angle as represented on a typical color wheel.

FIG. 2C illustrates the superposition of FIGS. 2A and 2B. As can be seen by way of example, the line 232 passes through the cusp 214 of the Magenta circle 204 and the Yellow circle 202 and effectively bisects the Red circle 212.

The three-sided area 226, together with the central six-sided area 230 indicates the overlap of R, G, and B. Similarly, the three-sided area 228 indicates the overlap of C, M, and Y. The six-sided central area 230 indicates the overlap of R'G'B' together with CMY. The overlap areas of overlap 226 and 228 are notionally gray/black. However, when CMY is used to reproduce black, the result is often unsatisfactory.

Preferably, the Cyan, Magenta and Yellow inks are mono pigmented. However, the Red, Green and Blue inks should be made up of two (2) pigments maximum.

L*a*b* data is another three-parameter color notation which is commonly used. L is luminance, and a* & b* are chrominance values ranging from Red to Green and Blue to Yellow respectively. In generating CMYK color separations, an initial set of RGB color separations can be derived from an image. These can then be converted to L*a*b* data using ICC profiles. The L*a*b* data can then be converted to CMYK using ICC profiles.

The CMYK data (i.e. pixel data in the CPU) has a dynamic range of 256 gray-levels (2.41 d). The invention enables the R'G'B' data to be derived from the secondary CMYK (256 gray-level) data. U.S. Pat. No. 5,751,326 refers to the CMYK data set as a result of tone compression to a printable density range. The printable density range quoted is 100 gray-levels (or 2.00 d) per primary color after the CMYK (256 gray-levels) is compressed to 100 gray-levels using halftone screening.

FIG. 3 illustrates the process of U.S. Pat. No. 5,751,326. The original image (1000 gray levels (3.00 d)) is scanned at 304 to produce the CMYK data at 256 levels (2.41 d). This is subjected to a 2.56:1 compression at 308 to produce the compressed CMYK data having 100 levels at 308.

A second scan is carried out at 310 to produce the R'G'B' data having 256 levels. This is in turn subjected to halftone compression of 2.56:1 at 712 to produce R'G'B' data having 100 halftone levels at 314. Thus the R'G'B' data is derived from the source image scanned at 310.

Figure 4:
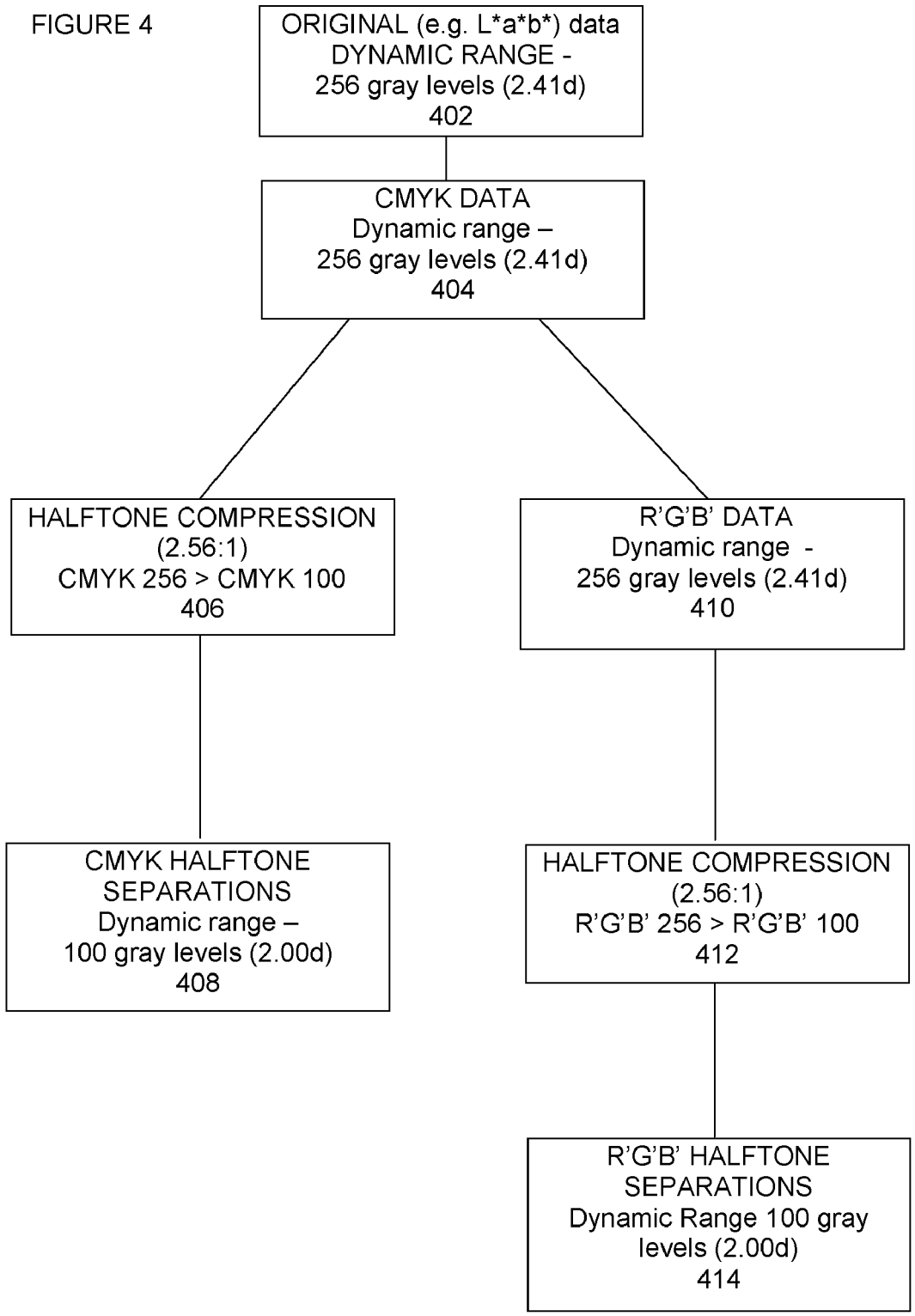
FIG. 4 illustrates a process for generating color separations according to a first embodiment of the invention.

The inventive color separation method can derive complementary R'G'B' data from CMYK data as shown in FIG. 4. Master data, for example L*a*b* data, having a dynamic range of 256 gray levels (2.41 d) is provided at 402. The L*a*b* data in turn can be derived from initial RGB data from an original image. The L*a*b* data is then converted to CMYK data having 256 gray levels (2.41 d) at 404 using a standard ICC profile. The CMYK data is then subjected to halftone compression of 2.56:1 at 406 to provide the CMYK halftone separation data with 100 gray levels (2.00 d) at 408.

As shown in FIG. 4, the 256 level R'G'B' data at 410 is derived from the 256 level CMYK data derived at 404. Thus the CMYK data from which the R'G'B' data is derived at 410 has not undergone the dynamic range loss which is incurred in the final CMYK halftone compression step 406.

The 256 gray level data at 404 is also manipulated to provide the complementary R'G'B' data having 256 gray levels at 410 using, for example, an algorithm or lookup table. The 256 gray level R'G'B' data is then subjected to halftone compression at 412 to produce R'G'B' halftone separation data with 100 gray levels at 414 for use in a printing process together with the CMYK halftone separations at 408.

Figure 5:
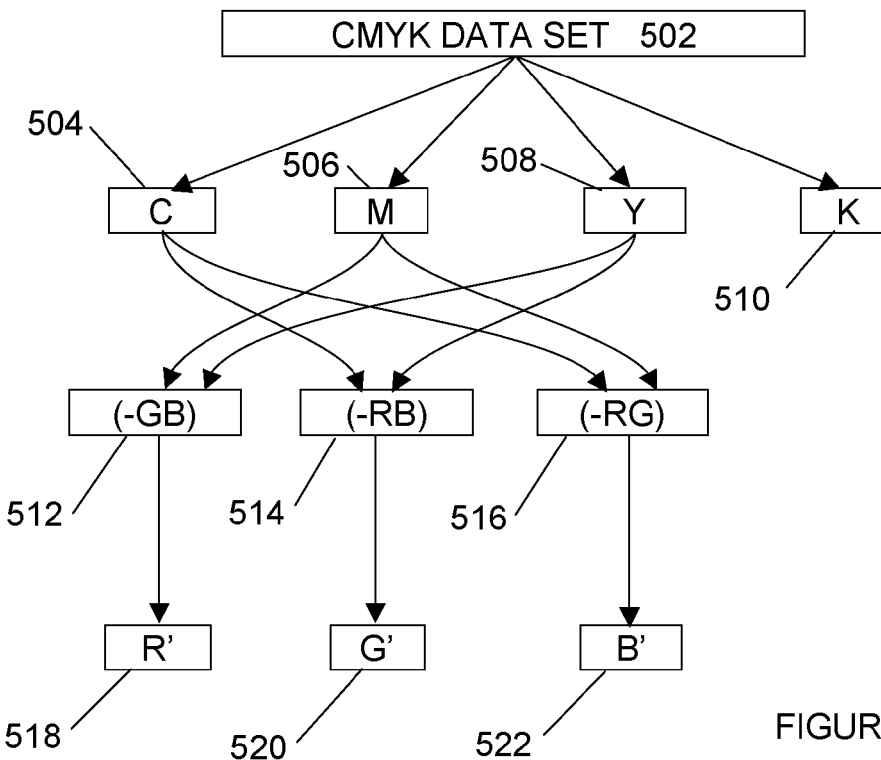
FIG. 5 illustrates a process for generating a complementary data set according to an embodiment of the invention.

FIG. 5 illustrates a generalized process for generating a complementary data set according to an embodiment of the invention.

A first color separation data set, for example a CMYK data set is shown at 502. The CMYK data set 102 includes four data fields, 504, 506, 508, 510 for the C, M, Y, and K data respectively for each pixel of an image. This data may have been derived from L*a*b* data using a standard ICC profile.

At step 512, the M and Y data is subjected to a first process, such as an algorithm or look up table, to produce (-GB) data.

At step 514, the C and Y data is subjected to a second process to produce (-RB) data.

At step 516, the C and M data is subjected to a third process to produce (-RG) data.

The (-GB) data from step 512 is then used to provide R' data at step 518, the (-RB) data from step 514 provides G' data at step 520, and the (-RG) data provides B' data at 522.

The CMYK data 502, 504, 506, 508 can have 256 gray levels, and this is converted to R'G'B' data having 256 gray levels at 512, 514, 516, 518, 520, 122.

Both the CMYK data 504, 506, 508, and the R'G'B' data 518, 120, 522 can then be subjected to halftone compression to 100 gray level data for use to control a printing process. In this arrangement, a seven (7) ink reproduction of the original image can be reproduced.

Preferably, the data is stored as a data set, and can be utilized subsequently. However, in some cases, the data may be generated as streaming data and processed "on the fly".

Figure 6A:
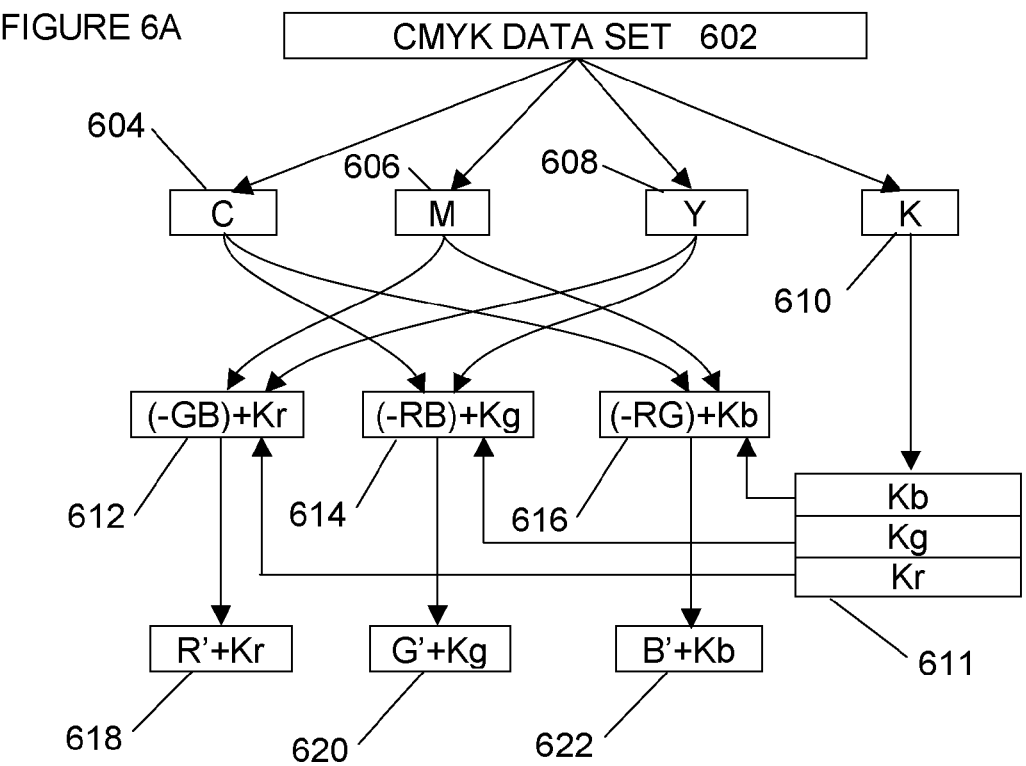
FIG. 6A illustrates a process for substituting the grayscale data according to an embodiment of the invention.

FIG. 6A illustrates a second embodiment of the invention in which the Black data from the CMYK data set is replaced by R'G'B' data. The R'G'B' data representing the Black data from the CMYK data can be combined with the complementary R'G'B' data derived from the CMYK data.

In FIG. 6A, the CMYK data set 602 contains the fields 604, 606, 608, 610 representing the C data, the M data, the Y data, and the K (Black) data respectively. As in the process illustrated in FIG. 5, the (-GB) data, the (-RB) data and the (-RG) data are derived from the CMYK data at steps 612, 614, and 616. However, the K data is also converted to R'G'B' data at 611 to produce a Red component Kr, a Green component Kg, and a Blue component Kb, and these components are also combined with the associated (-GB), (-RB), and (-RG) data to produce the combined complementary data and substitute data at 618, 620, and 622.

Figure 6B:
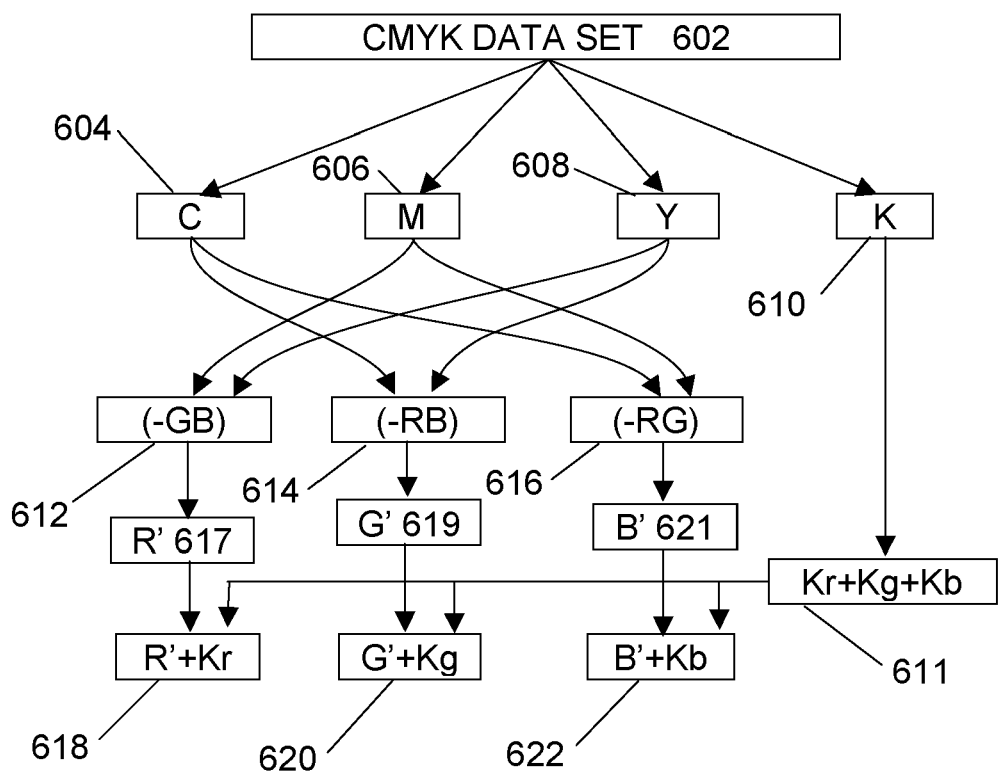
FIG. 6B illustrates an expanded version of FIG. 2A.

FIG. 6B illustrates the process of generating first R'G'B' data 617, 619, 621 from CMYK data and then adding the second R'G'B' values 611 from the K data to the first R'G'B' data to produce the combined R'G'B' data at 618, 620, 622.

In the arrangement of FIG. 6A, there are two (2) data sets. The first data set incorporates the CMY data, while the second data set incorporates both the complementary R'G'B' data and the substitute date Kr, Kg, Kb. Again, this data can be compressed from 256 to 100 gray levels (2.56:1) for a printing process. Thus this enables the image to be reproduced using only six (6) process inks, CMY and R'G'B'.

In one embodiment of the invention, a software program can be written to perform the Red, Green and Blue color separation method. Its functionality should include:

A) a dynamic range compression function able to compress pixel information from 0-255 gray levels to 0-0 gray levels;

B) a selective color correction function able to identify Red (Magenta and Yellow), Green (Cyan and Yellow) and Blue (Cyan and Magenta) pixel information in the CMYK data set in the dynamic range 0-255 gray levels;

C) a multiply pixel function able to multiply pixel information in the dynamic range 0-255 gray levels;

D) a duplicate pixel function able to duplicate pixel information within a dynamic range 0-255 gray levels.

The software programming functions A, B, C, and D are commonly known in the printing and graphic arts industry to perform the art of CMYK color separation.

As a preferred embodiment, a software R.I.P. could be programmed to execute steps A, B, C, D.

Figure 12:
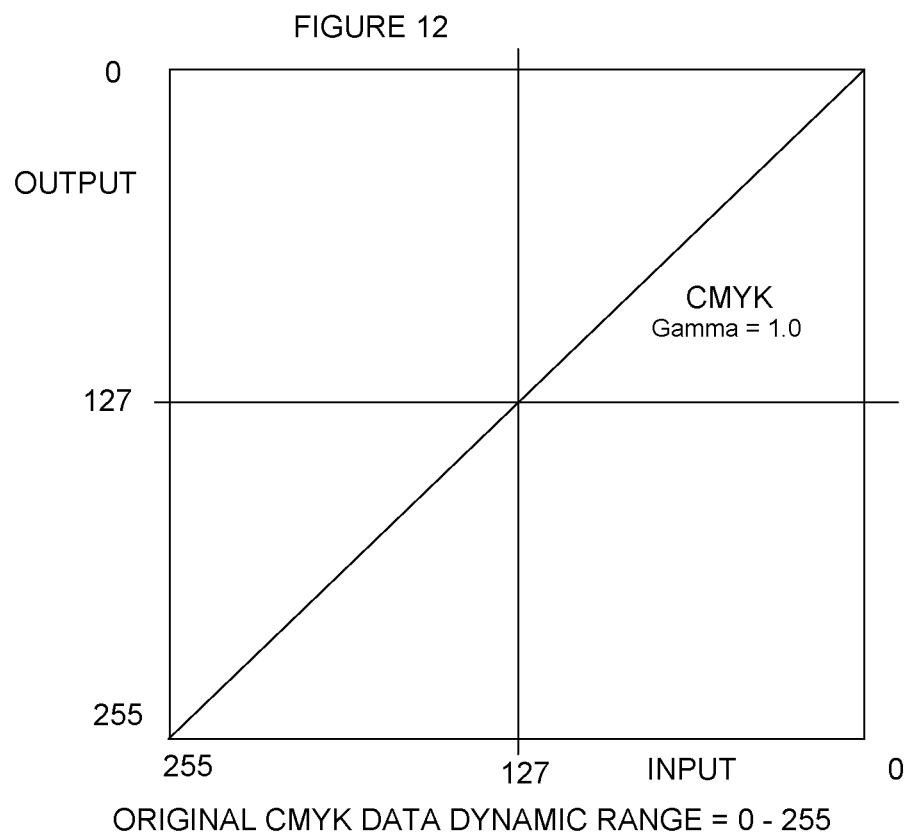
FIG. 12 illustrates CMY conversion using gamma=1.
Figure 13:
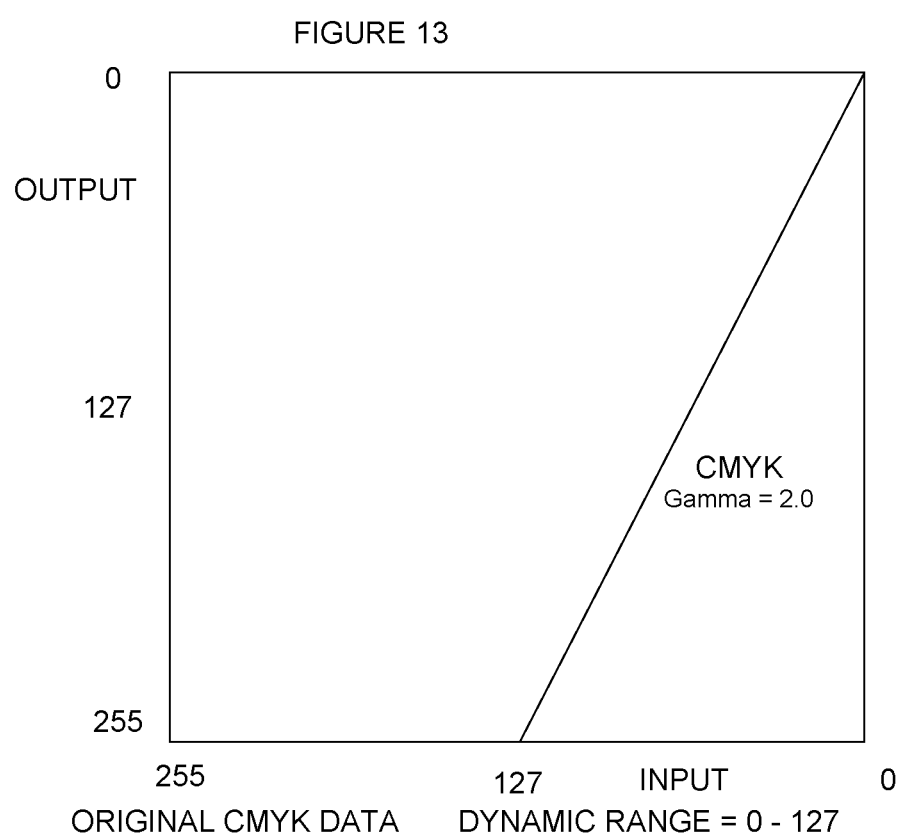
FIG. 13 illustrates CMY conversion using gamma=2.
Figure 17:
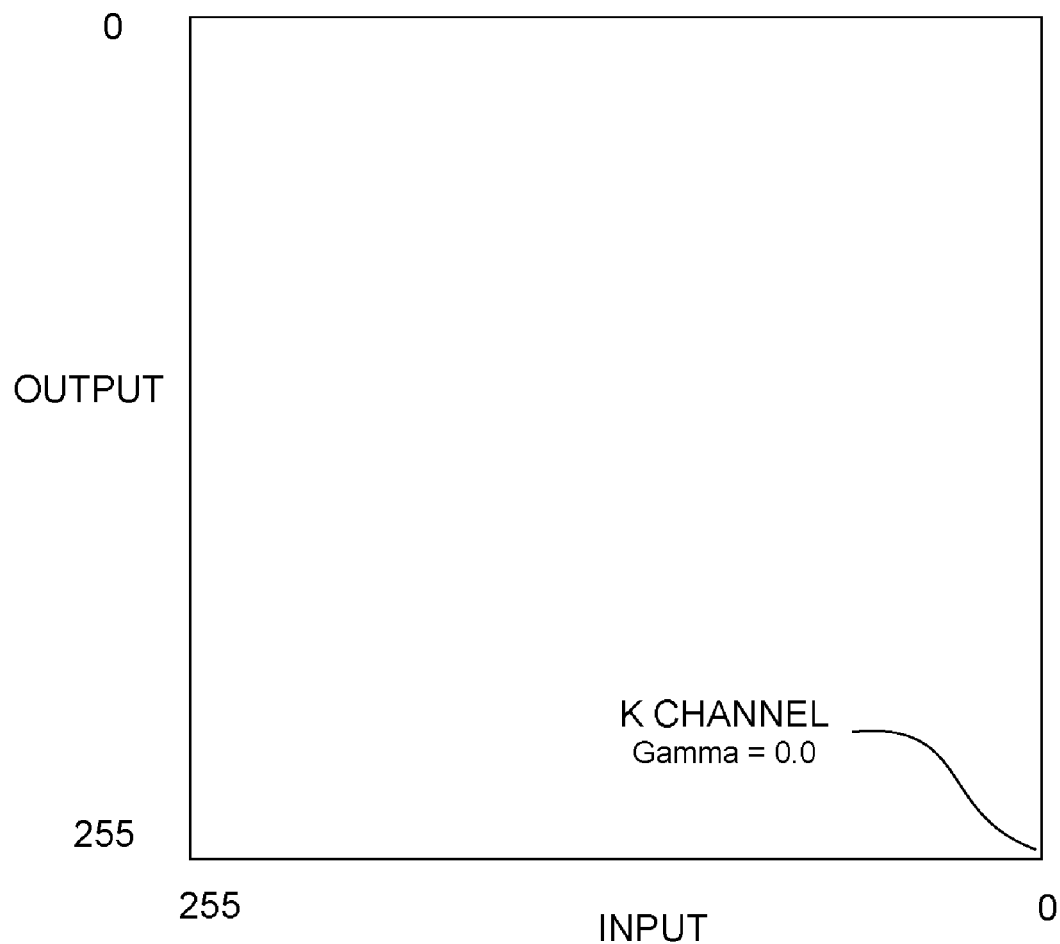
FIG. 17 illustrates compression of Black (K) data.

The programming steps to create Red, Green and Blue color separations for a print process can include the following:

Step 1: A gamma curve (ratio 1:2=gamma 2.0) is applied to restrict the CMYK input dynamic range of 0-255 gray levels to an output dynamic range of 0-127 gray levels. In addition, the Black channel pixel information can be further edited by applying the dynamic range compression function: 0-255 to 0-0 as illustrated in FIGS. 12 & 13 illustrate gamma values of 1.0 and 2.0 respectively. FIG. 17 is included for the sake of completeness to illustrate the compression of the K data form 0-255 to 0-0.

Step 2: After applying Step 1, a selective color correction algorithm is applied to record Red hues in the CMYK data wherein the Magenta and Yellow pixels intersect in the dynamic range 0-127. The Black data channel can be used to extrapolate the Red (Magenta and Yellow) data by applying a selective color correction function-Black in Reds with 100% opacity. The Red selective color correction mask will identify the intersecting Magenta and Yellow pixels in the dynamic range 127 m/0y>0y/0m>127y/0m. The cross-coupled Magenta and Yellow pixel data recorded within the Black channel can now be exported to a separate Alfa spot color channel. The Alfa spot color channel containing the Magenta and Yellow pixel data is renamed "Red" color separation data for a printing process. The software program recalls the original CMYK data thereafter, as illustrated in FIG. 14.

Step 3: After applying Step 1, a selective color correction algorithm is applied to record Green hues in the CMYK data wherein the Cyan and Yellow pixels intersect in the dynamic range 0-127. The Black data channel can be used to extrapolate the Green (Cyan and Yellow) data by applying a selective color correction function-Black in Greens with 100% opacity. The Green selective color correction mask will identify the intersecting Cyan and Yellow pixels in the dynamic range 127c/0y>0c/0y>127y/0c. The cross-coupled Cyan and Yellow pixel data recorded within the Black channel can now be exported to a separate Alfa spot color channel. The Alfa spot color channel containing the Cyan and Yellow pixel data is renamed "Green" color separation data for a printing process. The software program recalls the original CMYK data thereafter, as illustrated in FIG. 15.

Step 4: After applying Step 1, a selective color correction algorithm is applied to record Blue hues in the CMYK data wherein the Cyan and Magenta pixels intersect in the dynamic range 0-127. The Black data channel can be used to extrapolate the Blue (Cyan and Magenta) data by applying a selective color correction function-Black in Blues with 100% opacity. The Blue selective color correction mask will identify the intersecting Cyan and Magenta pixels in the dynamic range 127m/0c>0c/0m>127c/0m. The cross-coupled Cyan and Magenta pixel data recorded within the Black channel can now be exported to a separate Alfa spot color channel. The Alfa spot color channel containing the Cyan and Magenta pixel data is named "Blue" color separation data for a printing process. The software program recalls the original CMYK data thereafter, as illustrated in FIG. 16.

Step 5: The original Black channel pixel information is combined with the Red, Green and Blue channel pixel information by applying a tonal transfer to the Black channel pixel information as per the Black converter L.U.T. as illustrated in FIG. 8. The Black channel pixel information is then duplicated and combined, via the multiply pixel algorithm, into all three (3) Red, Green and Blue color separation data channels. The multiply pixel algorithm is set to 100% opacity.

Figure 10:
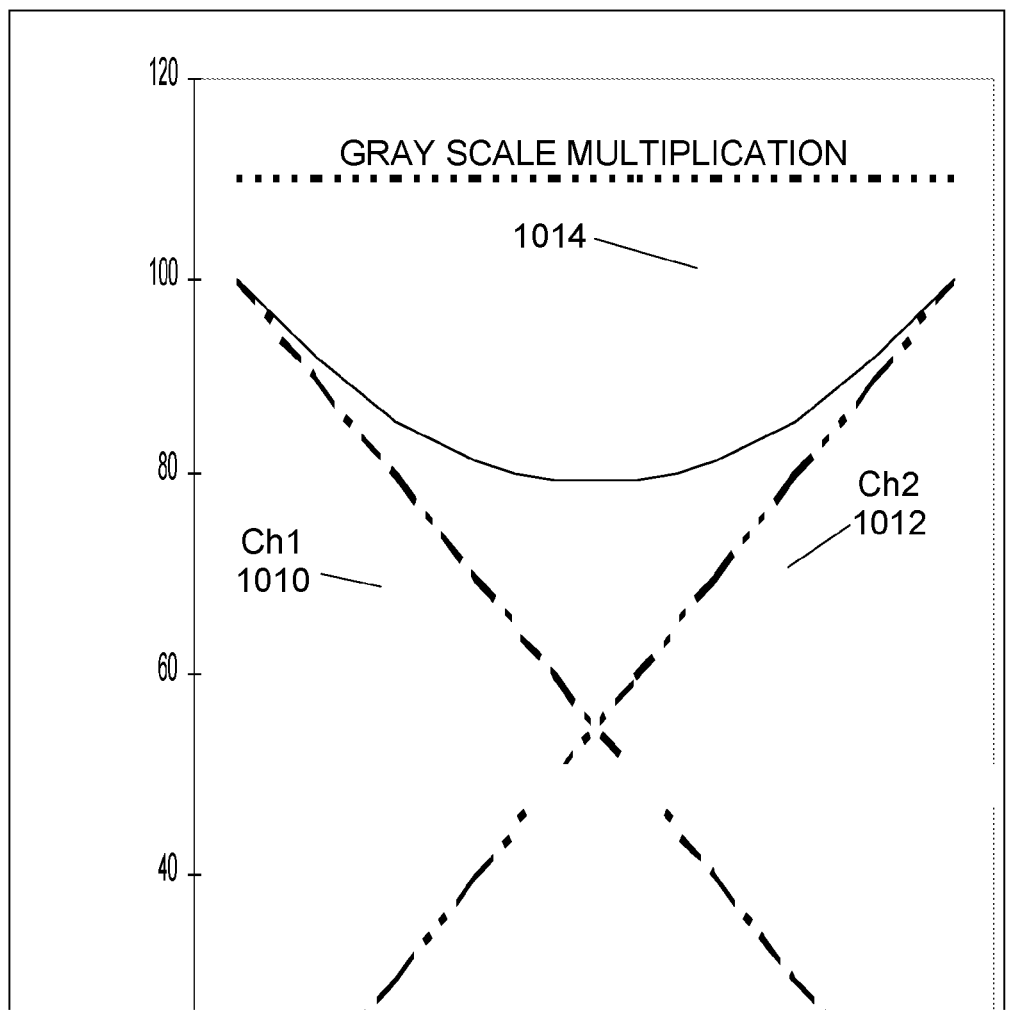
FIG. 10 illustrates grey scale multiplication.

The chart of FIG. 10 illustrates the process of multiplying two (2) sets of data 1010, 1012, the product being the curve 1014.

The Black channel pixel information is deleted from the CMYK data set by applying a dynamic range compression function: 0-255>0-0, as described with reference to FIG. 17.

TABLE 1

| CMY-R'G'B' Look up Table (Halftone %) | |
| --- | --- |
| INPUT % | OUTPUT % |
| CMY (x2) | R'G'B' (y1) |
| 100 | 100 |
| 90 | 80 |
| 80 | 60 |
| 70 | 40 |
| 60 | 20 |
| 50 | 0 |

R'G'B' output gamma curve: ratio 1:2 = 2.0
x1 = Highest C, M or Y value.
x2 = 2nd highest C, M or Y value at or higher than 50% (gray level 127).
y1 = R'G'B' saturation value.

Figure 11:
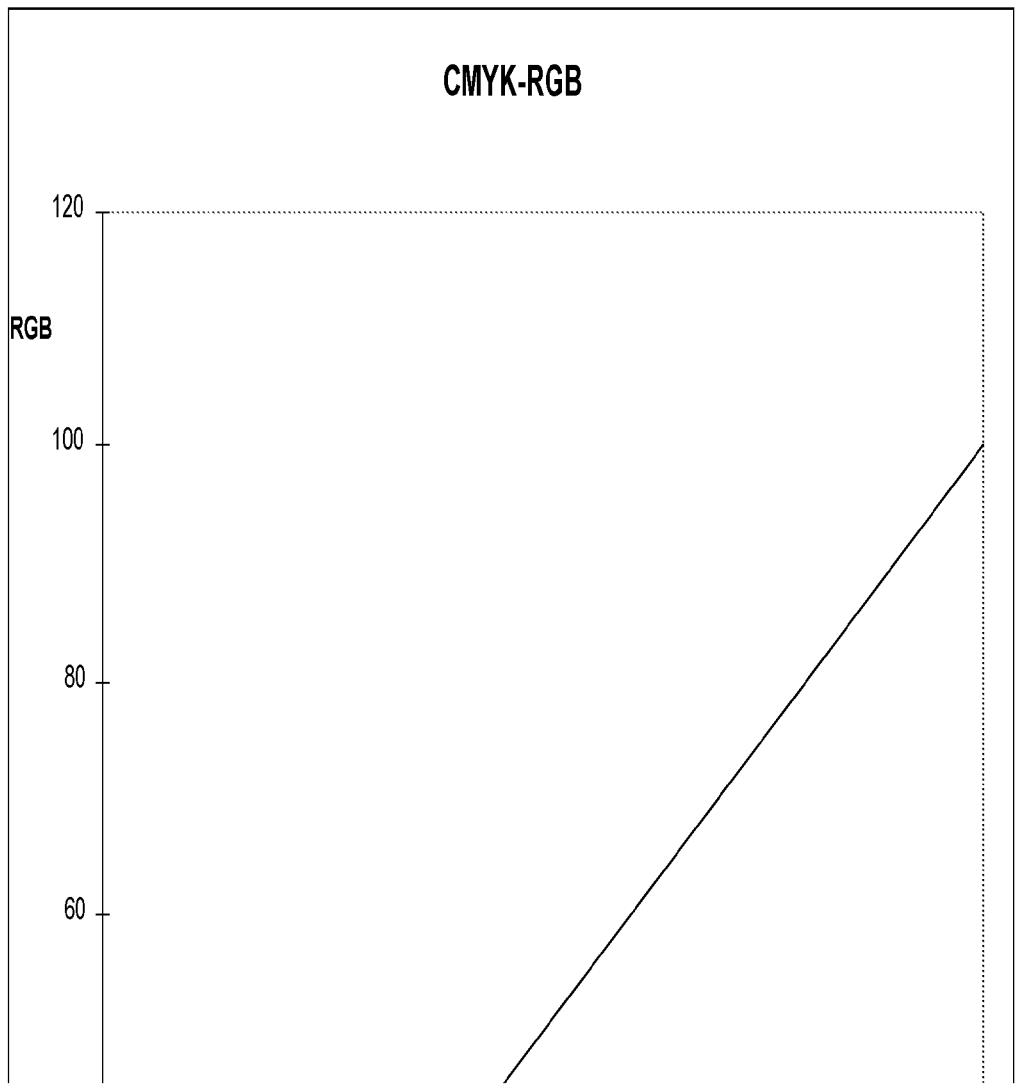
FIG. 11 is a chart illustrating CMY to RGB conversion.

The chart of FIG. 11 illustrates the corresponding graph for Table 1.

The R'G'B' saturation value for any given Red, Green or Blue hue is determined from the 2nd highest (x2) C, M or Y pixel value at or higher than 50% (gray level 127).

Below are several examples of R'G'B' output data derived from CMY input data:
x1=100c
x2=80m>y1=60(Blue)
x1=80y
x2=70c>y1=40(Green)
x1=100m
x2=100y>y1=100(Red)
x1=50m
x2=30y>y1=0(x2 is below 50%)
R'G'B' Desaturation Point When the 3rd highest C, M or Y (x3) pixel value reaches 50% or above (gray level 127), the R'G'B' (y1) saturation value is reduced as the Red, Green or Blue hue becomes desaturated (neutralized).
x1=Highest C, M or Y value
x2=2nd highest C, M or Y value (above 50%)
x3=3rd highest C, M or Y value (above 50%)
y2=R'G'B' value (calculated from x2)
y3=R'G'B' value (calculated from x3)
y2-y3=y1
For Example:
x1=100c
x2=80y>y2=60
x3=70m>y3=40 (y2)-(y3)=20(Green)
x1=100c
x2=100 m>y2=100
x3=80y>y3=60 (y2)-(y3)=40(Blue)
x1=80c
x2=70m>y2=40
x3=70y>y3=40 (y2)-(y3)=0(Neutral)

The conventional Cyan, Magenta and Yellow color separation data channels will print Cyan, Magenta and Yellow ink respectively. The Red, Green and Blue color separation data channels will print a combined saturation and neutral tone density image with Red, Green and Blue inks respectively. The Black (K) color separation data channel and Black printing ink may still be used in any printing process where the Black substitution is not performed.

A computer with a Central Processing Unit (C.P.U.) and the required software R.I.P. can be programmed to perform the fore mentioned steps to create Red, Green and Blue color separations for a printing process.

Figure 7A:
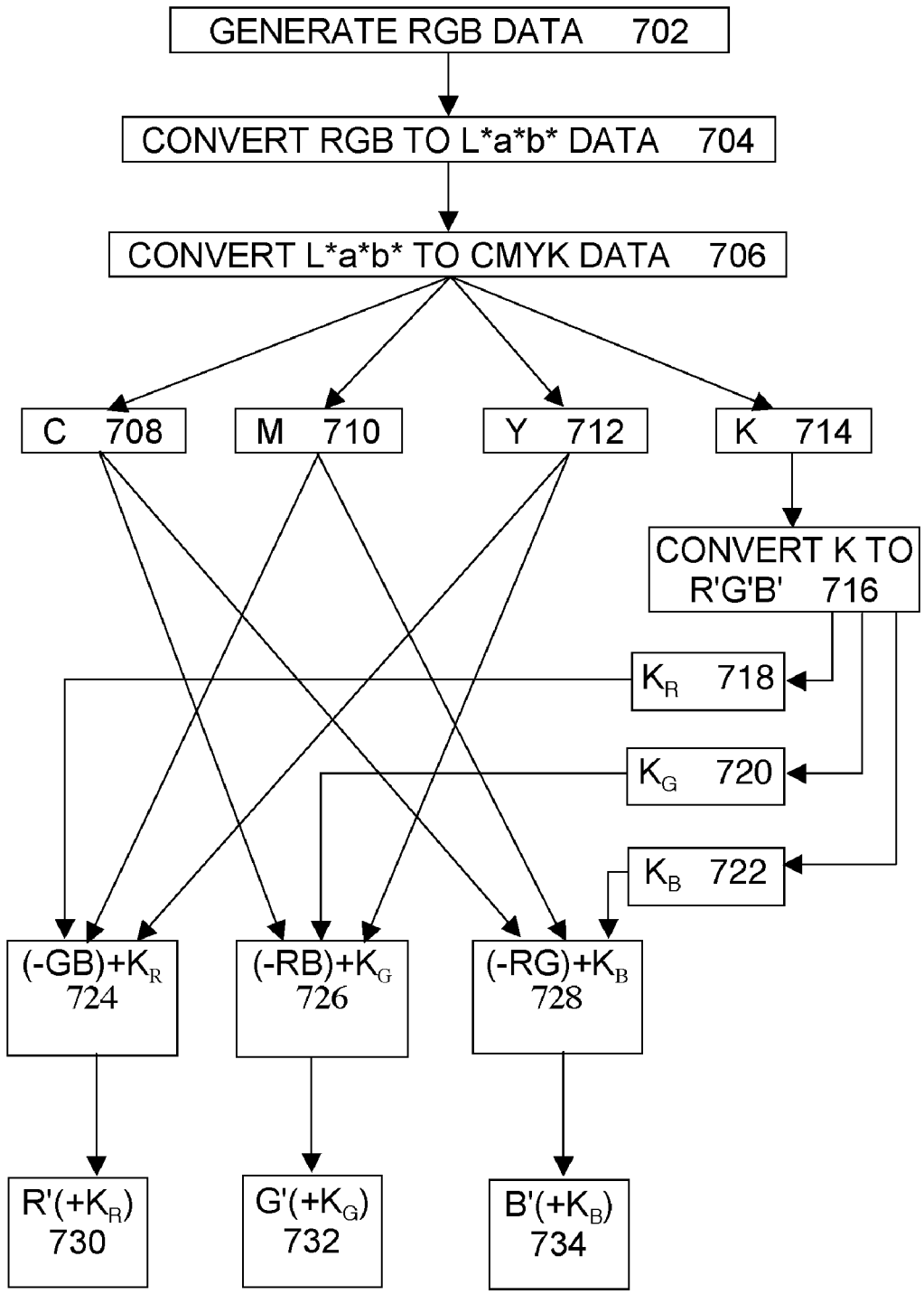
FIG. 7A illustrates a multi-stage color separation data conversion and flowchart of a process according to an embodiment of the invention.

FIG. 7A illustrates an end-to-end process for producing color separation data from an original RGB separation data derived from an original image. The process provides a method of producing secondary and tertiary color separation data sets from a primary color separation data set, the tertiary color separation data being derived from the secondary color separation data set. The secondary and tertiary data sets are available to control color reproduction in a printing process.

At step 702, RGB data is obtained from a digital color image of a selected color image, and this is then be converted to L*a*b* data at step 704 using a first algorithm. A standard ICC algorithm can be used in this conversion. The L*a*b* data serves as a primary data set from which the secondary data set is derived.

At step 706, the secondary data set, a CMYK data set in this example, is derived from the L*a*b* data set again using a standard ICC profile. This results in the individual C, M, Y, and K data fields 708, 710, 712, 714. As in the previous embodiments, the M and Y data is combined to produce (-GB) data, the C and Y data is combined to produce the (-RB) data, and the C and M data is combined to produce the (-RG) data at 724, 726, and 728. At 724, the M and Y data are combined to produce a (-GB) data value which is then converted to an equivalent Red value R' for the tertiary data set at 730. This value can be used to partially compensate for the data lost from the compressed halftone CMYK data. Similarly, at 726, C and Y are combined to produce a (-RB) value which is converted to a G value at 732 for the tertiary data set. Again, this value is used to partially compensate for lost data from the secondary compressed halftone CMYK data set. At 728, the C and M values are combined to produce a (-RG) value which is converted to a B value for the tertiary data set at 734, and this value also is used to compensate for information lost from the from the compressed halftone CMYK data set.

At the same time, the Black data K from 714 is converted to its constituent R'G'B' components Kr, Kg, Kb, as intermediate data 718, 720, 722 to substitute for the K data, and the intermediate data components are combined with the resultant (-GB), (-RB) and (-RG) data at 724, 726, 728 to produce the combined complementary and substitute data output 730, 732, 734. This method produces six (6) color data similar to that produced by the process of FIG. 2, being the CMY data at 308, 310, 312, and the R'G'B' data at 324, 326, 328 which can be subjected to halftone compression and used to produce a reproduction of the initial RGB image.

FIG. 7B illustrates a process similar to that of FIG. 7A in which the intermediate steps of converting RGB to L*a*b* and converting L*a*b* to CMYK are omitted. Thus the RGB at 702 is converted directly to CMYK 705.

FIG. 8 shows a table illustrating digital conversion of the Black (K) color separation data into Red, Green and Blue color separation data via a Look Up Table (L.U.T.) 802 according to an embodiment of the invention. A graph representative of the L.U.T. is shown in FIG. 9 at 904 with the K values represented on the abscissa and the R value shown on the ordinate. G and B values correspond to the R value as shown in the table.

The grayscale value for the specific Black information of the corresponding pixel is matched to the corresponding R'G'B' values from the look up table. This Red, Green and Blue color separation data is then digitally merged into the Red, Green and Blue color separation data channels as per FIG. 6A, 6B or 7A & 7B. The Black (K) color separation data is deleted after it has been converted via a L.U.T. into Red, Green and Blue color separation data.

Figure 18:
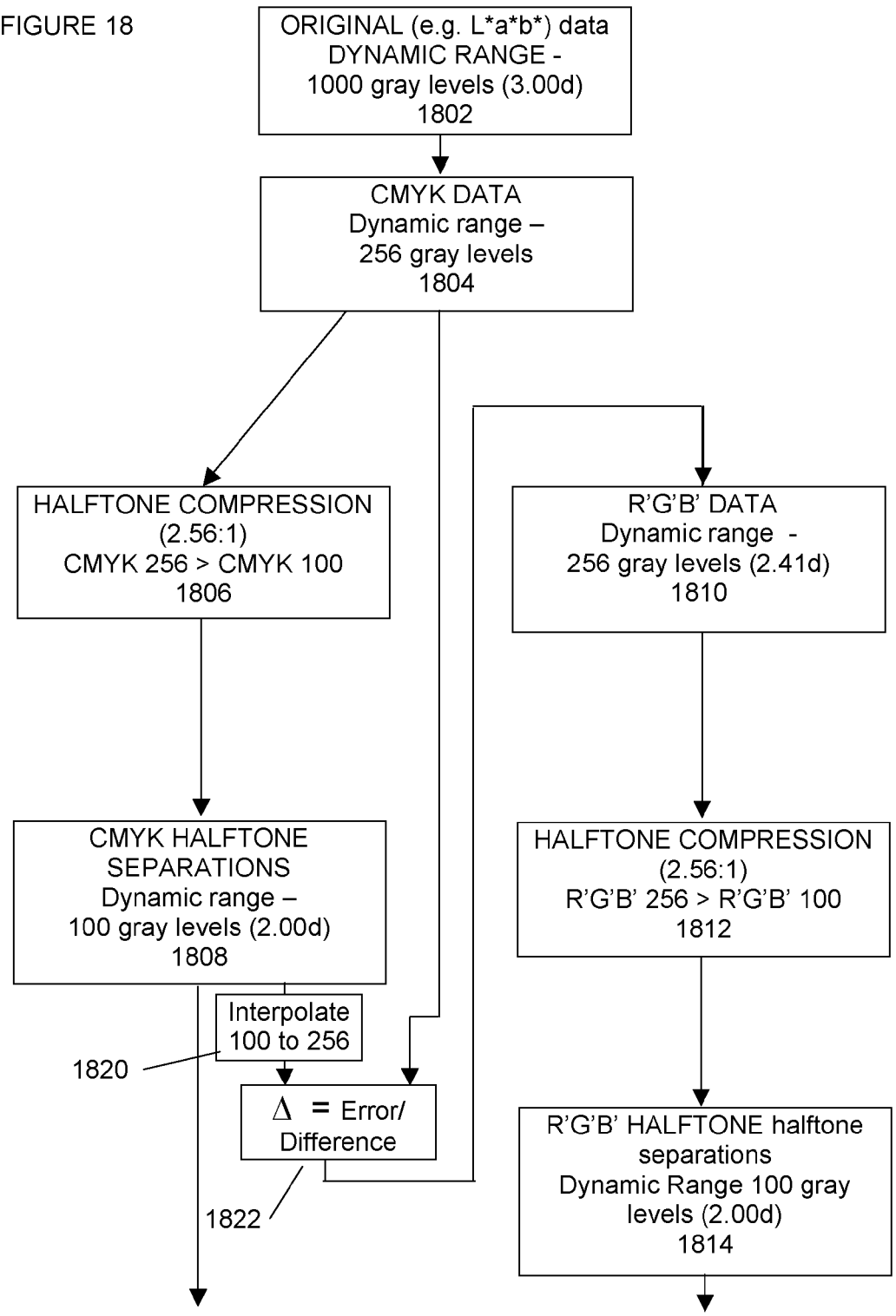
FIG. 18 is a flow diagram of an alternative implementation of the invention.
Figure 19:
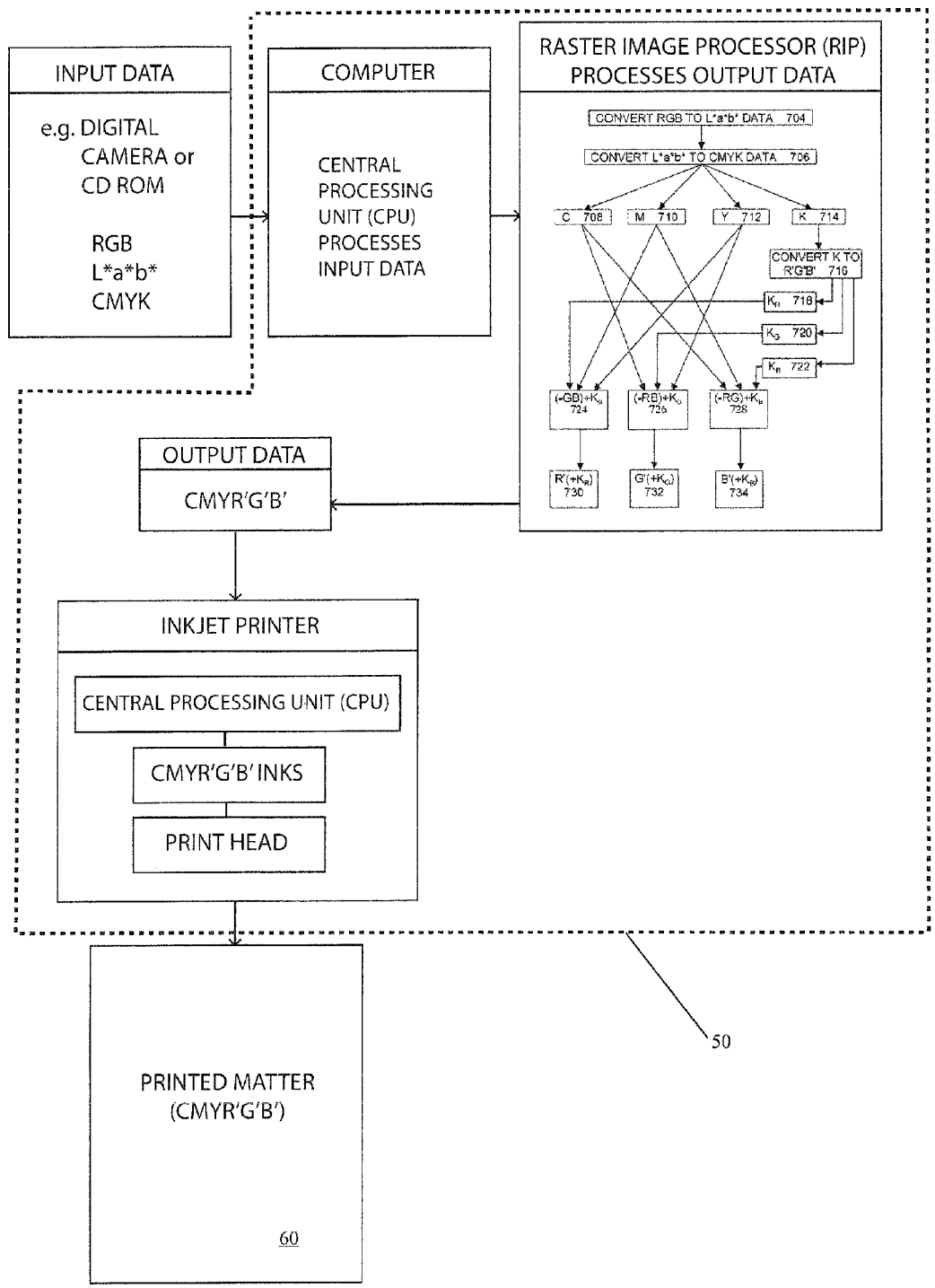
FIG. 19 is a schematic showing the connections of the computerized components implementing the method described herein.

FIG. 18 illustrates an alternative method of deriving the complementary R'G'B' data according to an embodiment of the invention. At 1804, CMYK data at 256 gray levels is generated from the L*a*b* data at 1802. and subjected to halftone compression to 100 gray level data at 1806, 1808. CMYK difference data is generated at 1822 by determining the difference between the data at 1804 and the data at 1808, and this CMYK difference data is then converted to R'G'B' data at 1810 and then compressed to halftone data at 1812, 1814 for use in the printing process.

It will be apparent that changes in, and modifications to the invention may be made without departing from the spirit and scope thereof.

While the term "data set" is used in the specification, the term is to be understood as being capable of encompassing ephemeral, real time data as well as static or stored data. Similarly, a reference to "data" encompasses static or stored data, such as a data set, unless the context requires otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two (2) or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein. The invention is further set forth in the following claims.

The invention claimed is:

1. A computer implemented method of controlling a printing process with a computer processor in a printer, the method comprising (i) utilizing the computer processor to produce augmented color separation data from first color separation data stored on the processor, and (ii) utilizing the computer processor to derive secondary and tertiary color separation data from the first color separation data,
wherein the secondary and tertiary separation data is printed in Cyan, Magenta, Yellow, Red, Green Blue and Black inks that have L*C*h° and absolute density values in the order of the following:
(i) for Cyan, L* is about 57, C* is about 60, h° is about 235, D is about 1.25;
(ii) for Magenta, L* is about 50, C* is about 72, h° is about 355, and D is about 1.25;
(iii) for Yellow, L* is about 90, C* is about 91, h° is about 94, and D is about 0.95;
(iv) for Red, L* is about 60, C* is about 79, h° is about 37, and D is about 1.15;
(v) for Green, L* is about 63, C* is about 75, h° is about 158, D is about 1.15;
(vi) for Blue, L* is about 41, C* is about 56, h° is about 274, D is about 1.25; and
(vii) for Black, L* is about 26, C* is about 1, and D is about 1.30.

2. A computer implemented method as claimed in claim 1, including the steps of utilizing the computer processor in the printer to:
compress the first color separation data to a printable dynamic range; and
compress the second color separation data to a printable dynamic range.

3. A computer implemented method as claimed in claim 2, wherein the first color separation data is first CMYK data, and the second color separation data is second R'G'B' data.

4. A computer implemented method as claimed in claim 3, wherein the computer processor utilizes compressed second color separation data to at least partially compensate for the dynamic range lost from the compressed CMYK data.

5. A computer implemented method as claimed in claim 1, including an initial step of generating via the computer processor the first color separation data from initial color separation data stored on the computer processor.

6. A computer implemented method as claimed in claim 5, wherein the initial data is first RGB data.

7. A computer implemented method as claimed in claim 1, including the step of utilizing the computer processor to convert Black (K) data in the first color separation data to substitute color separation data.

8. A computer implemented method as claimed in claim 7, wherein the substitute color separation data is third R'G'B' data.

9. A computer implemented method as claimed in claim 8, wherein the substitute data is combined with the complementary data via the computer processor.

10. A computer implemented method of color separation for a print process utilizing a computer processor for providing secondary and tertiary color separation data from primary color separation data, the secondary color separation data representing a printable dynamic range provided from primary color separation data and the tertiary color separation data providing color saturation data to compensate for dynamic range lost from the secondary color separation data as a result of tone compression to a printable dynamic range, the method comprising utilizing the computer processor to:
transfer gray scale data provided from the secondary color separation data to an intermediate color separation data;
combine the intermediate color separation data with the tertiary color separation data; and
remove the gray scale data from the secondary color separation data, wherein the tertiary color separation data is printed in Red, Green and Blue inks having L*C*h° and absolute density values in the order of the following:
(i) for Red, L* is about 60, C* is about 79, h° is about 37, and D is about 1.15;
(ii) for Green, L* is about 63, C* is about 75, h° is about 158, and D is about 1.15; and
(iii) for Blue, L* is about 41, C* is about 56, h° is about 274, and D is about 1.25.

11. A computer implemented method as claimed in claim 10 wherein the primary color separation data is in L*a*b* format.

12. A computer implemented method according to claim 10, wherein the secondary color separation data represents Cyan, Magenta, Yellow and Black color separations, wherein the tertiary color separation data is R'G'B' data, wherein the intermediate color separation data represents Red, Green and Blue color separations, and the method further includes the step of utilizing the computer processor to combine the intermediate color separation data with the tertiary color separation data.

13. A computer implemented method as claimed in claim 12, wherein the Red color separation of the tertiary color separation data is provided by deriving via the computer processor Red data from the Magenta and Yellow data within the secondary color separation data, wherein the Green color separation of the tertiary color separation data is provided by deriving via the computer processor Green data from the Cyan and Yellow data within the secondary color separation data, and wherein the Blue color separation of the tertiary color separation data is provided by deriving via the computer processor Blue data from the Cyan and Magenta data within the secondary color separation data.

14. A computer implemented method of color separation for a print process utilizing a computer processor in a printer for providing secondary and tertiary color separation data from primary color separation data, the secondary color separation data representing a printable dynamic range provided from primary color separation data and the tertiary color separation data providing color saturation data to compensate for dynamic range lost from the secondary color separation data as a result of tone compression to a printable dynamic range, the method comprising utilizing the computer processor to:

transfer gray scale data provided from the secondary color separation data to an intermediate color separation data;
combine the intermediate color separation data with the tertiary color separation data; and
remove the gray scale data from the secondary color separation data,
wherein the secondary and tertiary color separation data are printed in Cyan, Magenta, Yellow, Red, Green & Blue inks that have L*C*h° and absolute density values of the order of the following:
(i) for Cyan, L* is about 57, C* is about 60, h° is about 235, D is about 1.25;
(ii) for Magenta, L* is about 50, C* is about 72, h° is about 355, and D is about 1.25;
(iii) for Yellow, L* is about 90, C* is about 91, h° is about 94, and D is about 0.95;
(iv) for Red, L* is about 60, C* is about 79, h° is about 37, and D is about 1.15;
(v) for Green, L* is about 63, C* is about 75, h° is about 158, D is about 1.15; and
(vi) for Blue, L* is about 41, C* is about 56, h° is about 274, D is about 1.25.

15. A computer implemented method of using a computer processor in a printer to produce augmented color separation data from first color separation data, said first color separation data being stored on the computer processor, having color data and Black data, and being in a first format, the method including the steps of:

deriving via the computer processor complementary color separation data in a second format from the first color separation data;
deriving via the computer processor substitute color separation data from a Black component of the first color separation data, the substitute data being in the second format;
combining via the computer processor the substitute color separation data and the complementary color separation data to form combined data; and
utilizing the computer processor to remove the Black data from the first color separation data to produce reduced color separation data, wherein the reduced color separation data and the combined color separation data control a print process via the computer processor.

16. A computer implemented method as claimed in claim 15, including the step of utilizing the computer processor to compress the reduced data and the combined data to control a print process.

* * * * *